United States Patent [19]

Yamagiwa et al.

[11] Patent Number: 5,101,924
[45] Date of Patent: Apr. 7, 1992

[54] ELECTRIC MOTOR DRIVEN VEHICLE AND POWER UNIT THEREOF

[75] Inventors: Toshio Yamagiwa, Niiza; Takashi Ohzeki, Okegawa; Hideaki Suzuki, Funabashi; Hiroshi Uruno, Saitama; Yoshinori Kawashima, Sakado; Shoji Motodate, Fujimi, all of Japan

[73] Assignee: Honda Giken Kogyo Kabushiki Kaisha, Tokyo, Japan

[21] Appl. No.: 552,099

[22] Filed: Jul. 13, 1990

[30] Foreign Application Priority Data

Jul. 13, 1989 [JP] Japan .............. 1-181496[U]

[51] Int. Cl.⁵ ............................. B62K 11/00
[52] U.S. Cl. .................... 180/220; 180/230; 180/65.8
[58] Field of Search .......... 180/220, 221, 219, 205, 180/206, 227, 228, 229, 230, 231, 65.2

[56] References Cited

U.S. PATENT DOCUMENTS

| | | | |
|---|---|---|---|
| 3,773,131 | 11/1973 | Jaulmes | 180/220 X |
| 3,818,292 | 6/1974 | Berman | 180/65.8 X |
| 3,902,565 | 9/1975 | Farall | 180/65.1 |
| 4,109,186 | 8/1978 | Farque | 180/6.5 X |
| 4,209,709 | 6/1980 | Betton | 361/172 X |
| 4,345,664 | 8/1982 | Anno et al. | 180/230 |
| 4,406,342 | 9/1983 | Lacroix | 180/231 X |
| 4,410,060 | 10/1983 | Cunard | 180/220 X |
| 4,901,813 | 2/1990 | Kimura et al. | 180/230 |

FOREIGN PATENT DOCUMENTS

| | | |
|---|---|---|
| 0024373 | 3/1981 | European Pat. Off. |
| 2218730 | 11/1973 | Fed. Rep. of Germany |
| 2245767 | 3/1974 | Fed. Rep. of Germany |
| 1504121 | 3/1978 | United Kingdom |

Primary Examiner—Kenneth R. Rice
Assistant Examiner—Kevin Hurley

[57] ABSTRACT

The invention relates to an electric motor driven vehicle having a driving unit assembled with a motor and transmission mechanism. In order to avoid a load in a low rotational state of the motor, the transmission mechanism is connected with the motor and driving wheel within a range of predetermined rotational numbers in which the motor approaches the vicinity of maximum efficiency. Accordingly, motor driving is possible from the start, and because of the small electric power and the low heat generating quantity, cruising distance is extended and the apparatus is consequently made to be compact and of light weight. The transmission is provided with an automatic starting clutch and an automatic transmission is used as the automatic transmission, operation of the motor near the vicinity of maximum efficiency can always be maintained in the usual speed change range. The driving unit can be constructed compactly as a power unit of swing type. Further, an advantageous cooling mechanism of the motor and a wiring structure of an electric power supply cord are disclosed herein.

28 Claims, 21 Drawing Sheets

ELECTRIC MOTOR DRIVEN VEHICLE AND POWER UNIT THEREOF

BACKGROUND OF THE INVENTION

The present invention relates to an electric motor driven vehicle and the power unit thereof, and particularly, to an electric motor driven vehicle and power unit thereof capable of being driven by a motor from starting and capable of operation at reduced load at low speed.

An electric motor driven vehicle, such as an electric motor driven bicycle with a rear wheel driven by a motor through a transmission mechanism is known, and for instance, is disclosed in Japanese Utility Model Publication Official Gazette No. Sho-48-14271. In the above referenced known electric motor driven bicycle, a chain wound between a driving sprocket and a pedal is capable of being driven by the pedal. The driving sprocket is also made to be possibly driven by a DC motor; the DC motor connected to a battery through a governor. In order to operate the electric motor driven bicycle, speed is raised by man power through operation of the pedals, and when the speed reaches a predetermined running speed, the governor switch turns ON and the DC motor is started so that motor driving of the vehicle can be started.

Generally, a motor has a peculiarity that torque and current are large in the case of a low rotational state and efficiency becomes decreased. Here, the efficiency is given by the following expression:

$$n = 1.027 \cdot N \cdot T/(I \cdot V)$$

(N=number of rotations, T=torque, I=current, and V=voltage).

When a load is applied to the motor in such a low rotational condition, a negative effect occurs in that an amount of electric power consumption becomes larger and the cruising distance is shortened. Also, heat generation quantity becomes larger whereby deterioration of operational capacity soon results. The extent of good operational efficiency of the motor is therefore primarily limited to be within a relatively narrow range.

Therefore, although it is thought that the motor may not be started until it reaches a predetermined running speed as in the aforementioned example, it would be advantageous if motor driving and man power driving could be applied together in this case. Accordingly, such an electric motor driven vehicle is expected that can be driven by a motor from the start.

Further, there is also a need to adopt an integrally structured transmission mechanism with the motor to efficiently cool the motor because the heat generation quantity of the motor is great. Such a cooling system would result in a simplified wiring structure of the electric power supply cord of the motor.

SUMMARY OF THE INVENTION

Therefore, it is a first object of the present invention to provide an electric motor driven vehicle capable of being driven by a motor from the start and also capable of reducing a load at a low running speed with respect to the motor.

A second object of the present invention is to provide a power unit employing the above described driving structure.

A third object of the present invention is to provide an effective cooling structure in regard to the motor in said power unit.

A fourth object of the present invention is to provide an advantageous wiring structure of the electric power supply cord of the motor.

In order to solve the above described first object, the electric motor driven vehicle of this invention is characterized in that it is an electric motor driven vehicle which transmits the rotation of a motor through a transmission mechanism to a driving wheel, and this transmission mechanism is connected to the driving wheel only within the range of a predetermined rotational speed approaching maximum efficiency of said motor.

Further, the approaching of maximum efficiency is established voluntarily while excluding the low efficient range which may become disadvantageous by producing either a maximum torque or a large current in the case when the motor is loaded.

When the rotation of the motor is increased and it reaches a predetermined rotational speed approaching maximum efficiency of the motor, the transmission mechanism is connected to a driving shaft side, and the rotation of the motor side is transmitted to the driving wheel side through the transmission mechanism only within this range. Therefore, motor load at low efficiency is avoided, and since it becomes possible to run the vehicle only within the range of good efficiency of the motor, which was relatively limited originally, consumption of electric power is reduced. Consequently, the discharging efficiency of the battery becomes high whereby battery life is long and the cruising distance can be extended. And, since the heat generation quantity is also decreased, the deterioration of operational capacity can be prevented and durability is therefore increased and, at the same time, since the above may be implemented with components of small electric power, the motor can be made compact and light.

Further, the transmitting mechanism can be made to be an automatic centrifugal force clutch or automatic speed change transmission. In the case of the latter, since the speed change can be carried out in the range of the predetermined rotational speed approaching the maximum efficiency of the motor by the automatic speed change transmission in response to the establishment of a speed change condition, the motor is always kept near maximum efficiency during the speed changing. Further, when the range between two ratios of maximum and minimum efficiency of the automatic speed change transmission is established so as to change the speed while keeping a proper motor rotational speed as it is when the motor approaches maximum efficiency in the time of 100% duty factor, the motor can always be operated in a maximum efficiency state within the usual speed change range, and thereby the above-described advantage becomes most remarkably clear. Further, when the duty factor of the usual speed change range is established to be a predetermined value of less than 100% so the excessive output corresponding to at least an increment of running resistance being obtained in maximum ratio, the increment of running resistance can be overcome by the excessive output even if the usual speed change range approaches a maximum ratio, and thereby running in maximum ratio can be made more powerful.

For the second object of the present invention, the driving wheel is rotatably mounted to a transmission case movably supported to a vehicle body, and simultaneously, a belt type stepless speed change transmission, which is an automatic speed change transmission provided within the transmission case connected with this driving wheel, and a motor contained within a motor housing provided to a side of the transmission case are connected, so that it can be constructed as a power unit for rotationally driving said driving wheel. When the power unit is made integrally as above, the driving mechanism can be made compactly.

Further, the entire power unit is contained within the recess formed at the external surface of the driving wheel, so that it can be made further lighter and slimmer, and at the same time, the external appearance can be made neat and smart. Further, the motor housing and the transmission case can also be made integrally, in this case, since the number of parts can be decreased and simultaneously the stress can be dispersed to both sides. The strength is thereby improved and simultaneously, the heat dispersion improves whereby the cooling efficiency of the motor housing side increases. Further, when the electric power supply cord of the motor is fixed to a cover side mounted from sideward of the motor housing, assembly of the motor is made easier.

For the third object of the present invention, a port for connecting the interior of the transmission case and the interior of the motor housing of said power unit is provided, and at the same time, the motor and the belt type stepless speed change transmission can be cooled by a common cooling fan. Thus, the entire apparatus can be made compact by implementing the cooling fan in common.

Further, the cooling fan can also be mounted either to the driving pulley of the belt type stepless speed change transmission or to the rotary shaft of the motor adjoining the port within the motor housing. Even if it is made as such, the entire apparatus can be made compactly and at the same time, in the case of the latter, the heat within the motor housing can be discharged efficiently to the belt type stepless speed change transmission side.

Furthermore, it can also be made such that a duct of which one end is connected with the interior of the motor housing is provided opposite of the transmission and another end of this duct is made to be opened to the interior space of the vehicle, so that cooling air for the forced air cooling may be fed from this duct to the interior of the motor housing. If it is made as such, the cooling can be executed by introducing clean air containing less dust and moisture.

For the fourth object of the present invention, the electric power supply wire cord of the motor is either arranged in the interior of said duct, or directly drawn out of the motor housing to its exterior without passing through the transmission case. If it is made as such, interference with the belt type stepless speed change transmission side can be avoided, and the wiring becomes easy and at the same time, according to the former, it can be fixed without using any special component since it is not smeared directly by mud or moisture.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1 to 14 show a first embodiment of the present invention, in which

FIG. 1 is a schematic side view of an electric motor driven automatic bicycle;

FIG. 2 is a cross-sectional view taken along line I—I of FIG. 1;

FIG. 3 is a fragmentary diagram of an essential part taken from arrow III of FIG. 2 which is partly cut out;

FIG. 4 is a cross-sectional view taken along line IV—IV of FIG. 1;

FIGS. 5 and 6 are respectively magnified fragmentary views of an essential part of first and second clutches;

FIG. 7 is a circuit diagram showing a control system of the motor;

FIG. 8 is a longitudinal cross-sectional view of acceleration grip;

FIG. 9 is a cross-sectional view taken along line IX—IX of FIG. 8;

FIG. 10 is a cross-sectional view taken along line X—X of FIG. 8;

FIGS. 11(a) and 11(b) are graphs for illustrating a setting method of a speed change condition;

FIG. 12 is a graph of motor characteristic according to duty factor;

FIG. 13 is a magnified fragmentary sectional view taken along line XIII—XIII of FIG. 1;

FIGS. 14(a and 14(b) are graphs of characteristic curves of an electric motor driven automatic bicycle according to this embodiment;

FIG. 5 is a fragmentary diagram of an essential part according to a second embodiment which is partly cut out;

FIGS. 18 to 22 are diagrams according to a fourth embodiment, in which

FIG. 18 is a diagram corresponding to FIG. 1;

FIG. 19 is a diagram corresponding to FIG. 2;

FIG. 20 is a magnified fragmentary cross-sectional view taken along line XX—XX of FIG. 18;

FIG. 21 is a wiring diagram of a battery;

FIG. 22 is a diagram illustrating indicators for indicating remaining quantity;

DETAILED DESCRIPTION OF THE PREFERRED EMBODIMENTS

Hereinafter, the first embodiment of the present invention will be described in detail with reference to FIGS. 1 to 14.

Figure 1:
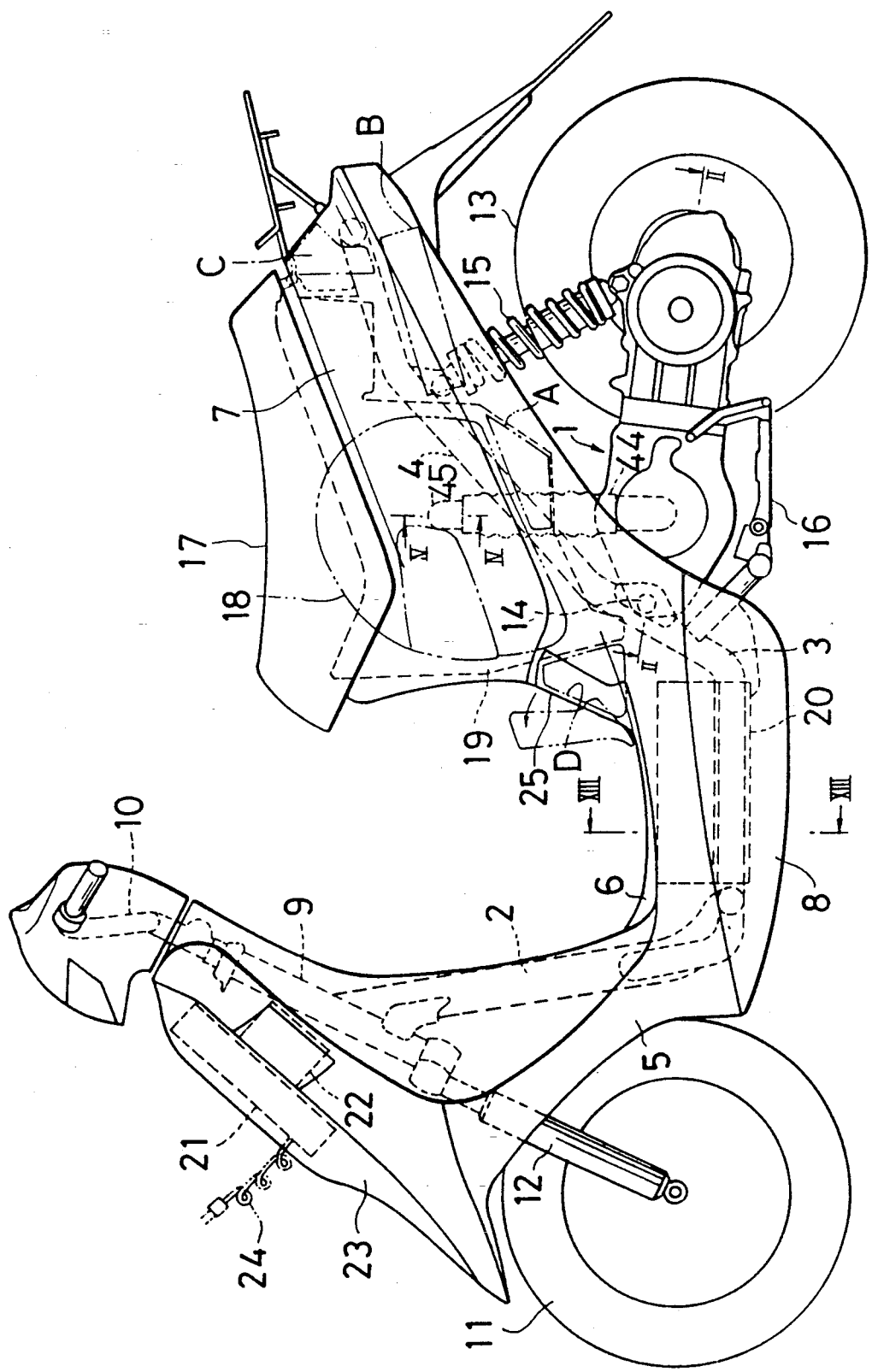

FIG. 1 is a side view of the entire body of an electric motor driven automatic bicycle mounted with a power unit according to the present invention. The vehicle body frame is structured with front frame 2, central frame 3 and rear frame 4. The exterior side of the vehicle body frame is covered by a vehicle body frame made of synthetic resin assembled with leg shield 5, step floor 6, rear cover 7 and under cover 8.

Direction steering handle 10 is provided at the top of head pipe 9 fixed to the front frame 2. A front fork 12 for supporting a front wheel 11 is connected to the bottom end.

The front end of swing type power unit 1 for supporting the rear wheel 13 at the rear end is mounted to the rear portion of the central frame 3 by a pivot 14 and is supported to be able to oscillate freely upward and downward. The top surface of the rear portion of the power unit 1 and the rear frame 4 are connected through a rear cushion 15. A stand 16 connected to the central frame 3 covers the bottom surface of the front portion of the power unit at a storing position not shown, and serves concurrently as a protection member for the motor, to be described hereinafter, stored within the interior. A container 19 for receiving a helmet etc. is provided within the inner side of the rear cover 7 between the power unit 1 and the seat 17. This container 19 is formed of a material for shielding magnetism so that any article such as a floppy disk is not effected by the magnetism generated by the driving motor.

A battery box 20 for storing a battery, such as an electric power supply for driving the motor, to be described hereinafter, is provided at the inner side of the under cover 8 in the central frame 3.

A controller 21 for controlling the motor during driving and a charger 22 for charging the battery are provided within the inner side of the front cover 23 at the frontward area of the head pipe 9. Electric wire cord 24 for charging connected to the above noted element is made to be connectable to an exterior commercially available electric power supply by opening a lid of the front cover 23, which is not shown.

Further, the controller 21 and the charger 22 can possibly be accommodated within various places with an integral body or separate body. For instance, the controller 21 can be provided within the area of A or B shown by imaginary lines at the rear portion of the vehicle body. The charger 22 can also be provided within the area of C of the vehicle body rear portion or within the area D of the central portion of the vehicle body. In the case of D position, a lid 25 capable of opening and closing freely is provided along a portion of the stepping floor 6, and said charging cord 24 is made to be capable of being taken out and in from the lid.

The structure of power unit will next be described with reference to FIG. 2. The power unit 1 is provided with a unit case 26 for supporting the pivot at the front end. The unit case 26 is an article wherein the motor housing 27 of the front portion, the transmission case 28 of the central portion and the gear box 29 of the rear portion are integrally formed. The motor 30 is contained within the motor housing 27, the belt type stepless speed change transmission 31 within the transmission case 28, and the final reducing gear 32 within the gear box 29. The motor 30 and the final reducing gear 32 are connected through the belt type stepless speed change transmission 31. The belt type stepless speed change transmission 31 is an example of a transmission mechanism and automatic speed change apparatus in this application.

Figure 3:
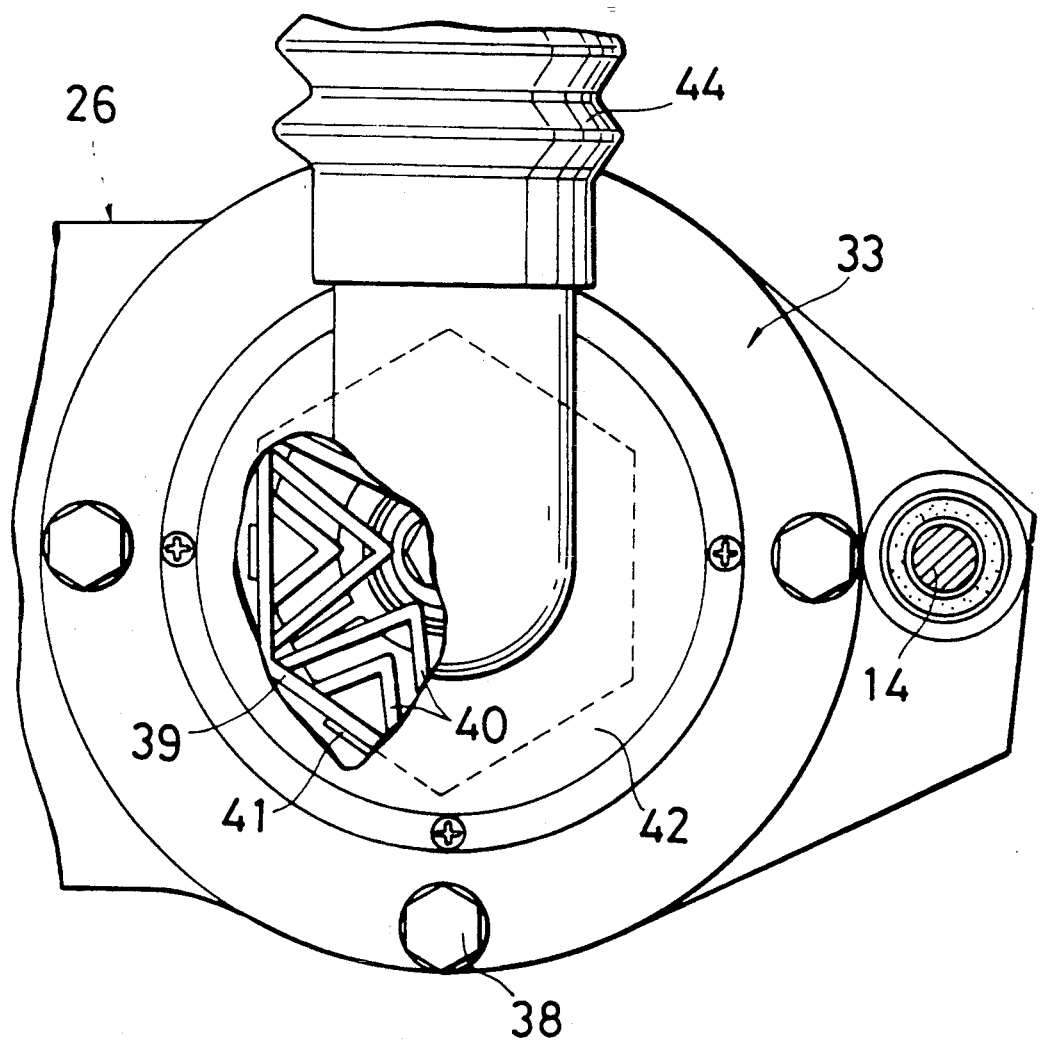

The motor housing 27 is opened to the right side in a direction of vehicle width, and cylindrical portion 34 of stator housing 33 of substantially cylindrical shape with a bottom is inserted into said opening portion, which is blocked by the bottom portion 35. The stator housing 33 is a member for covering the right side opening portion of the motor housing 27. A boss 36 protruding inward (central side of vehicle body, it is the same hereinafter) to its central portion at its bottom portion 35 and vent 37 of its surroundings are formed and simultaneously, the external peripheral portion is fixed to the motor housing 27 by bolt 38. A driver 39 protruding sideward with a rectangular tubular shape surrounding the vent 37 is formed outward of the bottom portion 35. A driver 39 is, as shown in FIG. 3 as well, a member of substantially hexagonal shape provided with the driving circuit, which will be described hereinafter. A plurality of V-shaped cooling fins 40 are provided along the internal surfaces of each latus. Also, FET (field effect transistor) 41, which will be described hereinafter, is fixed to its external surface.

Figure 4:
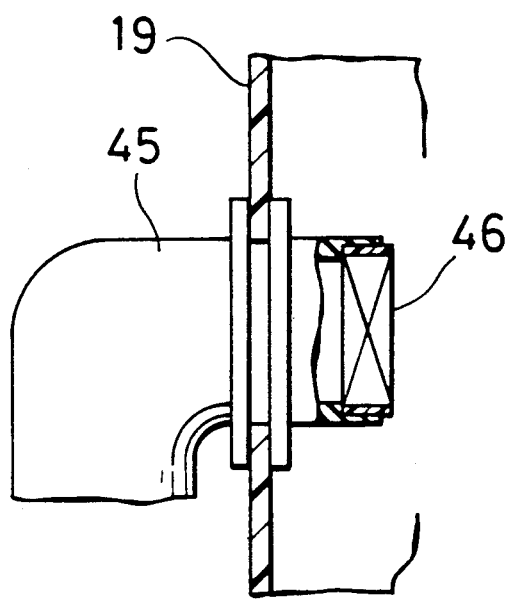

Further, a cup-shaped cover 42 covering driver 39 is fixed outward of the bottom portion 35, and the interior space is made to serve as an air introducing chamber 43. An end portion of flexible duct 44 is connected to the cover 42 (FIGS. 1, 2 and 8), and another end portion is coupled to the interior of the container 19 provided at the bottom portion of the seat 17. A sponge filter 46 for eliminating the dust within the air is contained within the inlet opening of joint 45 for connecting to duct 44 of the container 19 (FIG. 4). The electric power supply wire cord 47 for connecting the motor 30 and the driver 39 is led by piercing through the interior of the duct 44, which is wired through the cover 42 to the interior of the air introducing chamber 43 and the motor housing 27.

A partitioning wall 48 is integrally formed to the boundary portion of the motor housing and the transmission case 28. Each interior space of the motor housing 27 and the transmission case 28 formed by the partitioning wall 48 are communicated together.

A rotary shaft 50 of the motor 30 is supported by bearings (51 and 52) provided cooperating with the partitioning wall 48 and the boss 36 of the stator housing. An end of the rotary shaft 50 is protruded to the interior of the transmission case 28 by piercing through the partitioning wall 48.

A rotary shaft portion cooling fan 53 for blowing air through the vent 49 at a portion approaching the partitioning wall 48 is provided cooperating with the rotary shaft 50 of the motor 30.

The left side surface of the transmission case 28 is covered by a cover 54, and air discharge port 55 is formed at its rear end portion.

The motor 30 is a DC brushless motor, which is provided with a rotor 58 arranged with permanent magnet 57 around the external circumference of iron core 56 fixed to the rotary shaft 50. A stator 62 made of stator coil 61 is wound around iron core 60 and is fixed to the tubular portion of the stator housing 33 by bolt 59. A magnet 63 fixed to an end portion of the rotary shaft 50 and a rotor position sensor 65 made of three hole elements 64 arranged about the side of boss 36 surrounding this magnet is provided.

For this motor 30, the stator 62 is previously assembled into the stator housing 33, and then this stator housing 32 is inserted from the opening portion into the interior of the motor housing 27, so that the motor case is thereby constructed.

The belt type stepless speed change transmission 31 is provided with a driving pulley 66 mounted to the rotary shaft 50 protruding from the motor housing 27 into the interior of transmission case 28. A driven pulley 68 is mounted to an input shaft of the reducing gear supported at the rear portion of the transmission case 28. An endless belt 69 is wound between said pulleys 66, 68. The driving pulley 66 consists of a fixed face 70 fixed to the rotary shaft 50 and a movable face 71 slidably supported in an axial direction to the rotary shaft 50. A centrifugal force weight 73 movably mounted in a radial direction is arranged between this movable face 71 and a ramp plate 72 fixed to the rotary shaft 50. A pulley portion cooling fan 74 is integrally formed on the side surface of the fixed face 70. The pulley portion cooling fan 74 according to this embodiment serves mainly to provide heat discharge in the vicinity of fixed face 70, and is provided as a subsidiary cooling fan relative to the rotary shaft portion cooling fan 53. Further, the fins may be cut out or made smaller in order to be made lighter, and in this case, the dimension of the width direction of the cover 54 can be made smaller.

On the other hand, the driven pulley 68 consists of a fixed face 76 supported by a sleeve 75 rotatably inserted relatively around the input shaft 67 of the reducing gear and a movable face 77 mounted around the input shaft 67 slidable in an axial direction. The driving power transmitted to this driven pulley 68 is transmitted to the input shaft 67 of the reducing gear through the first centrifugal force clutch 78 which is a starting clutch.

Figure 5:
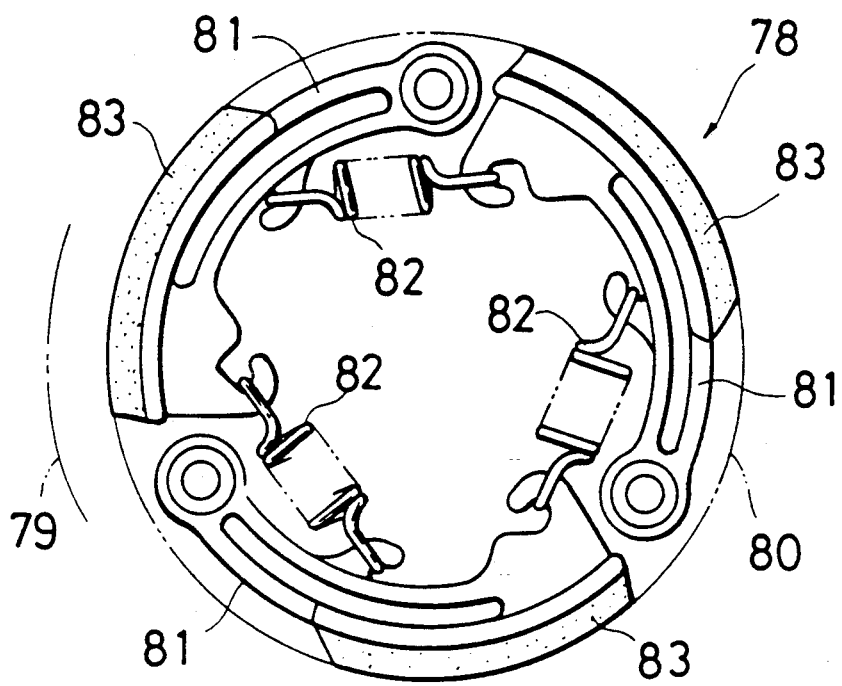

The first centrifugal force clutch 78, as shown in FIG. 5, is an example of a transmission mechanism of automatic centrifugal force clutch used in this application. As will be apparent from FIG. 5, it is constructed with a clutch outer 79 fixed to an end portion of the input shaft 67 of the reducing gear, a clutch inner 80 fixed to an end portion of sleeve 75, and three arms 81 with each respective first end fixed to the side surface of the clutch inner 80 with the respective other ends of each of the arms 81 connected by coil springs 82 to each other. Pads 83, capable of coupling with friction to the clutch outer 79, are provided along the external peripheral portion. Further, as shown in FIG. 2, spring 84 is mounted between the clutch inner 80 and mobile face 77. The clutch outer 79 and the clutch inner 80 are used in combination with the clutch inner and clutch outer of the second centrifugal force clutch 85.

Figure 6:
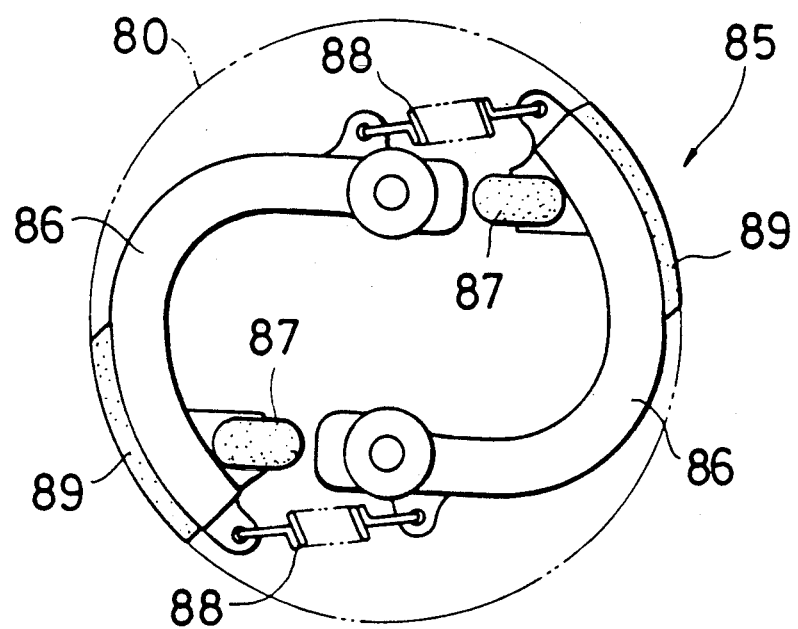

The second centrifugal force clutch 85 operates as an engine brake, as will be described in detail in FIG. 6, in which respective weight 87 is fixed to the other end side of two bent arms 86 whose respective first ends are mounted to the side surface of the clutch outer 79. The interval between both parties are connected by coil springs 88 and pads 89, capable of coupling with friction to the clutch inner 80, are provided thereat.

The first centrifugal force clutch 78 connects the sleeve 75 and the input shaft 67 of the reducing gear at, for example, over an established rotational speed of a little less than the maximum efficiency producing rotational speed of the motor 30. The second centrifugal force clutch 85 is established so as to be, for example, about 400 rpm less than the established rotational speed of the first centrifugal force clutch 78.

Figure 2:
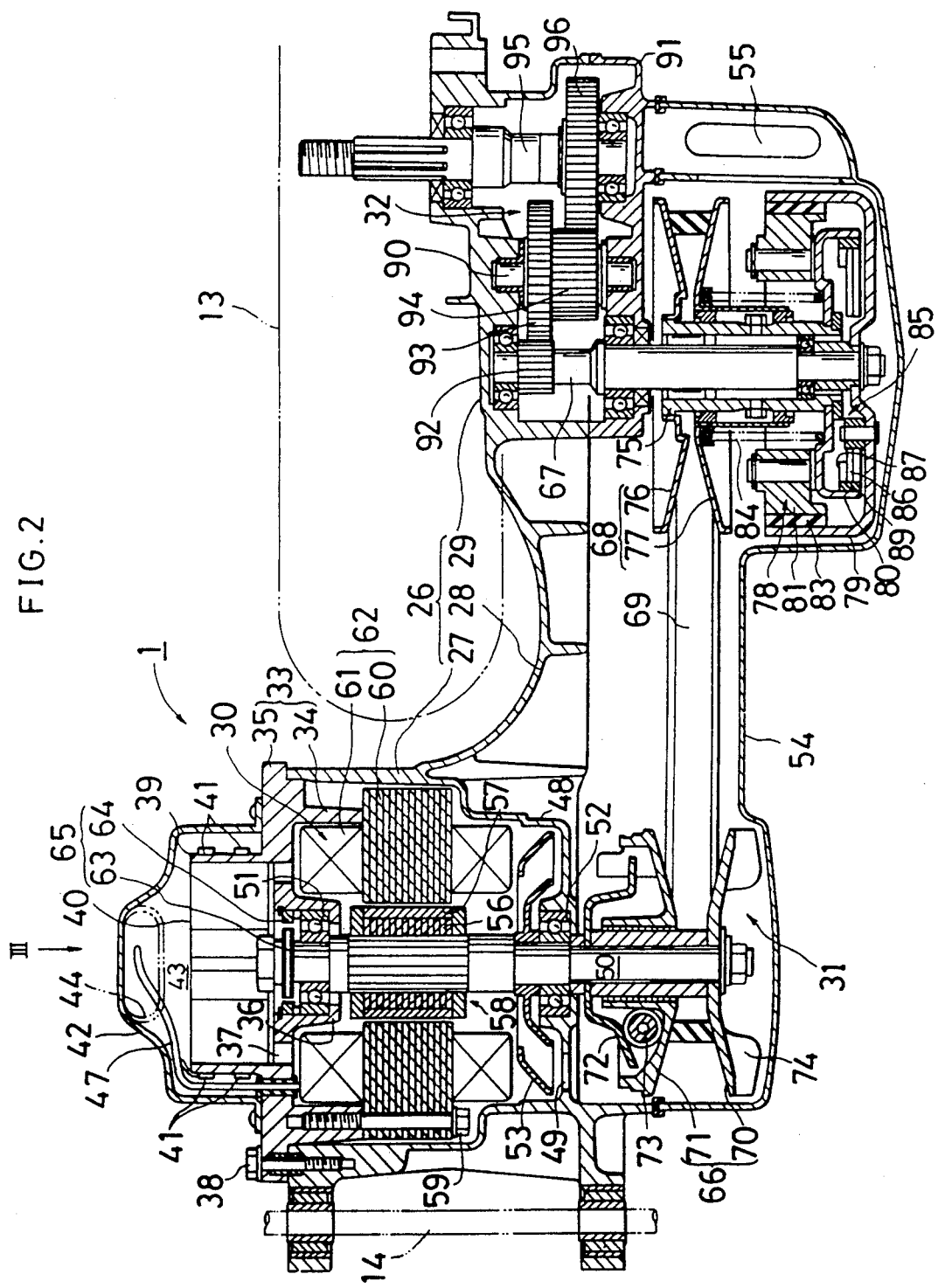

Final reducing gear 32, as shown in FIG. 2, is supported through the ball bearings in which the input shaft 67 of the reducing gear and intermediate shaft 90 are respectively provided within the transmission case 28 and the reducing gear cover 91. The rotation of the input gear 92 of the input shaft 67 of the reducing gear is transmitted through two intermediate gears 93, 94 of the intermediate shaft 90 to an output gear 96 of vehicle shaft 95.

Figure 7:
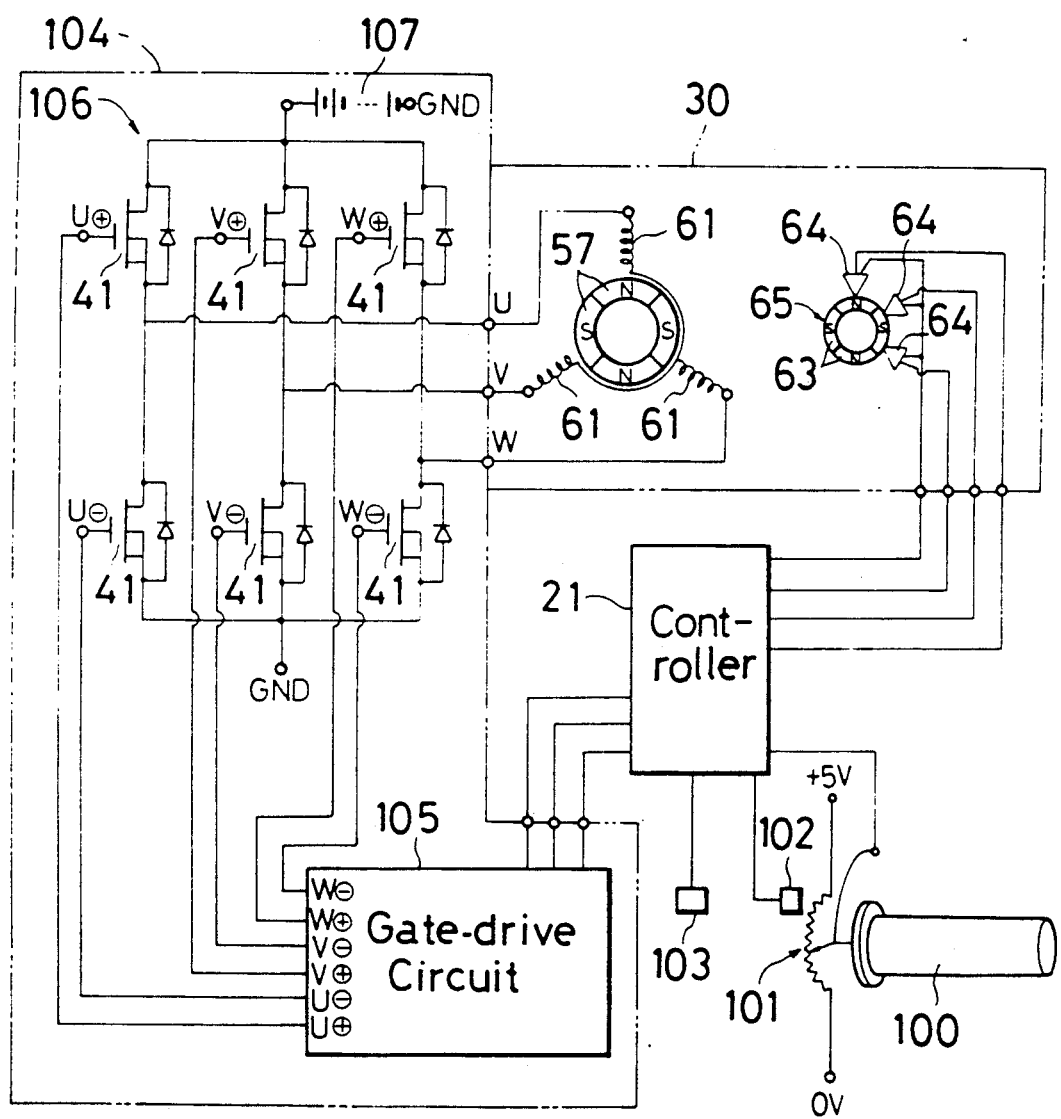

FIG. 7 is a circuit diagram showing a control system of the motor, in which a potential of potentiometer 101 connected to an acceleration grip 100 of the direction steering handle, is used to control the rotational speed of the motor 30. A phase signal of the rotor 58 detected by the rotor position sensor 65 is inputted to the controller 21, and further, potentiometer 101, switch 102 for detecting a minimum operational angle of the acceleration grip 100, brake switch 103, a vehicle speed sensor 99 and driving circuit 104 are connected to the controller 21.

The controller 21 has a microcomputer which determines a duty factor of current conducted to the motor 30 according to the output signal of potentiometer 101 and the vehicle speed sensor, and determines the phase of an alternating magnetic field in the stator coil 61 according to the output signal of the rotor position sensor 65. The controller 21 outputs a PWM signal representing the phase and duty factor for each stator coil 61 to a driving circuit 104 and further discriminates the control state according to the output of the switch 102 and the brake switch 103 and outputs the control command signal to the driving circuit 104 in time of braking. The driving circuit 104 includes a gate driving circuit 105 and switch circuit 106. The gate driving circuit 105 is connected to the controller 21, and the switch circuit 106 to the stator coil 61. The switch circuit 106 is arranged in such a manner that three pairs of FETs 41 wired in series are connected in parallel between a battery 107 and ground. The gate of each FET 41 is connected to the gate driving circuit 105, and further respective source-drain connection nodes are connected respectively with three terminals of the stator coil 61 which is star-wired. This driving circuit 104 drives the FETs 41 to be ON-OFF according to the PWM signal outputted by the controller 21 to thereby conduct the current for generating the alternating magnetic field to the stator coil 61 of the motor 30. The controller 21 conducts signals from the terminal to the stator coil 61 by the FET 41 which outputs the control command signal and thereby executes the electrical control of the motor 30.

Figure 8:
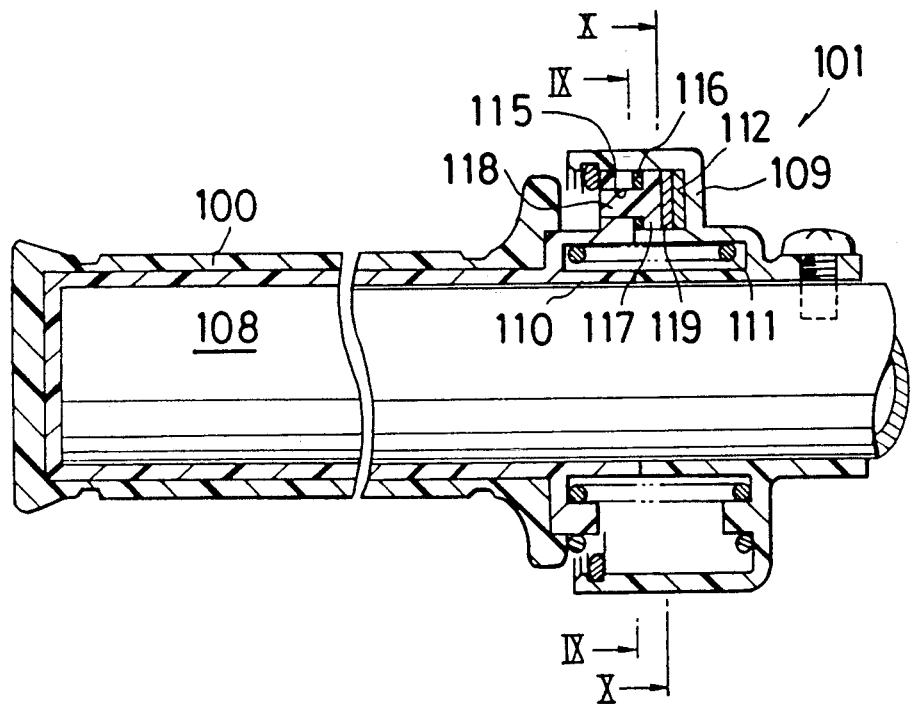
Figure 9:
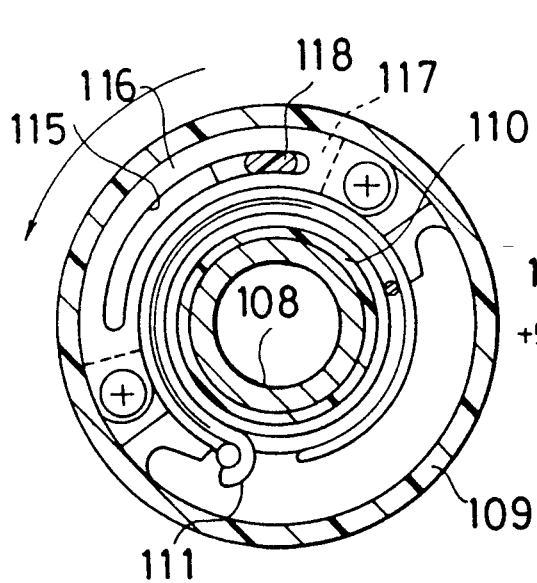
Figure 10:
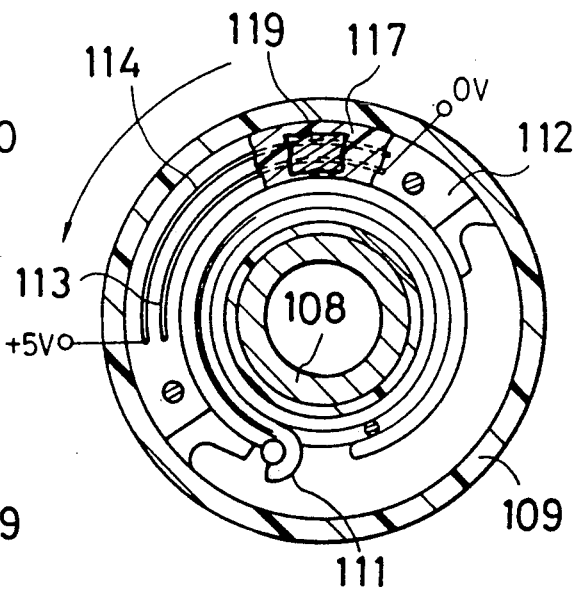

The structure of the potentiometer is shown in FIGS. 8 to 10. A torsional spring 111 for urging the acceleration grip 100 toward the idling position is mounted between a fixed bracket 109 of ring shape fixed to the middle of the handle pipe 108. A rotary bracket 110 of tubular shape is rotatably inserted to the front end of the handle pipe 108, that is, inserted integrally by pressure with the acceleration grip 100 to its external circumference. The potentiometer 101 for operating by rotational operation of the acceleration grip 100 includes a resistor 114 and a conductive body 113 printed in parallel on the surface of arc-shaped printed board 112 fixed to the bottom of the fixed bracket 108. Potentials of 0 volt and 5 volts are applied to these conductive bodies 113 and resistor 114, respectively. A guide plate 116 having an arc-shaped guide groove 115 is fixed in parallel with the printed board 112 at the interior of the fixed bracket 109. A protrusion 118 formed on the rear surface of the guide groove 115 of the guide plate 116 is held to the rotary bracket 110 by passing through the guide groove 115 of the guide plate 116. A metal plate 119 connected electrically to the controller 21 is fixed to the front surface of sliding member 117 so as to be contacted simultaneously to the resistor 114 and the conductive body 113 of the printed board 112. The potential of the metal plate 119 becomes about 0.5 volt in the case when the acceleration grip 100 is positioned at the shown idling position. When the acceleration grip 100 is rotated in the shown arrow direction toward the full load position, its potential is increased gradually up to about 4.5 volts in the case of this embodiment.

FIGS. 11(a) and 11(b) are modeling graph for illustrating a method of establishing a speed changing condition, wherein a motor characteristic of the motor 30 is shown by [I], and a speed change characteristic of the belt type stepless speed change transmission is shown by [FIG. 11(b)].

Figure 11:
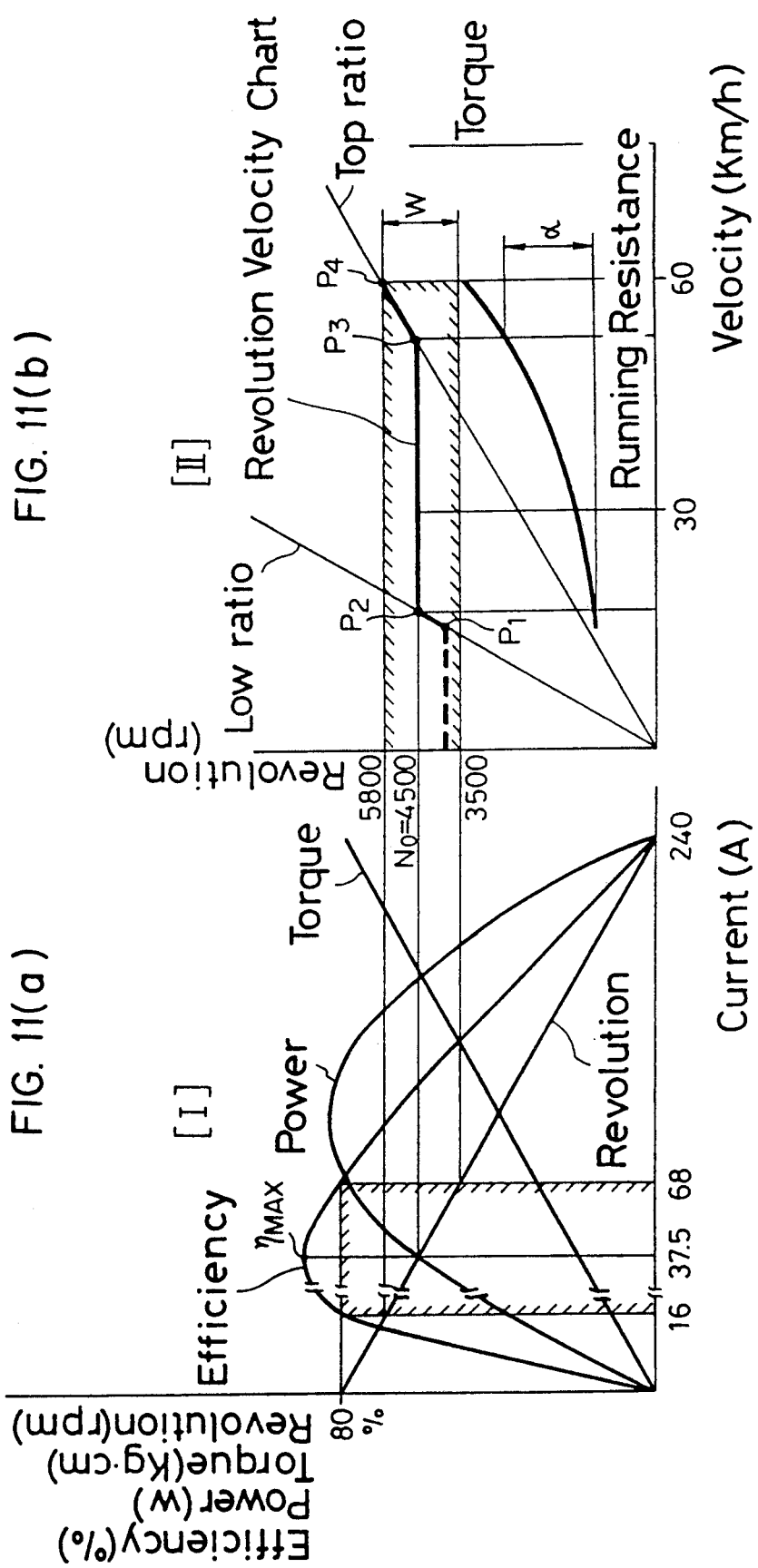

Firstly a speed change condition in FIG. 11(a) will be described. The motor characteristic shown by FIG. 11(a) corresponds to the case of 100% duty factor, in which this current is shown on the abscissa. The efficiency, output, rotational speed of the motor and the torque of the motor are shown as ordinates. In consideration of efficiency, as apparent from FIG. 11, a peak of maximum efficiency ($n_{max}$) is approximately 90% at about 37.5 A and the rotational speed of the motor is approximately 4500 rpm at this moment.

An efficiency of over 80% is maintained within the range from about 16 A to 68A, and this range W shown in FIG. 11(b) corresponds to a vicinity of maximum efficiency in this embodiment. The rotational number of the motor within this range is about from 3500 to 5800 rpm.

On the other hand, the belt type stepless speed change transmission is established with a condition so as to be speed-changed only when it is operated within the range of over 80% in efficiency which is considered as within maximum efficiency of the motor. That is, the diagram in FIG. 11(b) denotes vehicle speed on the abscissa, and the rotational speed of the motor (and torque of rear wheel driving shaft) as ordinates, and surrounded by hatched lines, the range of rotational speed of the motor corresponding to the range of over 80% efficiency is illustrated. The speed change curve falls within this range, and the clutch meets at a point P1 which is a little lower rotational speed than that at maximum efficiency which produces a rotational speed $N_o$ (4500 rpm) obtained with maximum efficiency whereby both the speed and the rotational speed of the motor are raised along the low ratio. The speed change is started with a constant rotational speed from a point P2 of the maximum efficiency producing rotational speed, $N_o$. This speed change is increased in speed in a stepless manner by the maximum efficiency producing rotational speed $N_o$, per se, whereby execution up to the point P3 crossing with the top ratio. Thereafter, the rotational speed of the motor and the vehicle speed are raised together along the top ratio, and then a limiting point P4 of 80% in efficiency is reached.

The speed at this point P4 is established as a limiting speed (for example, 60 km/h). When it is done as this, the running of the motor is possible by maintaining a maximum efficiency ($n_{max}$) always within the usual speed change range (interval between P2-P3).

Further, although the above described case is an example wherein the duty factor is taken as 100%, in the case when a running resistance is considered, as will be described hereinafter, the duty factor within the usual range can be established a little lower.

Figure 13:
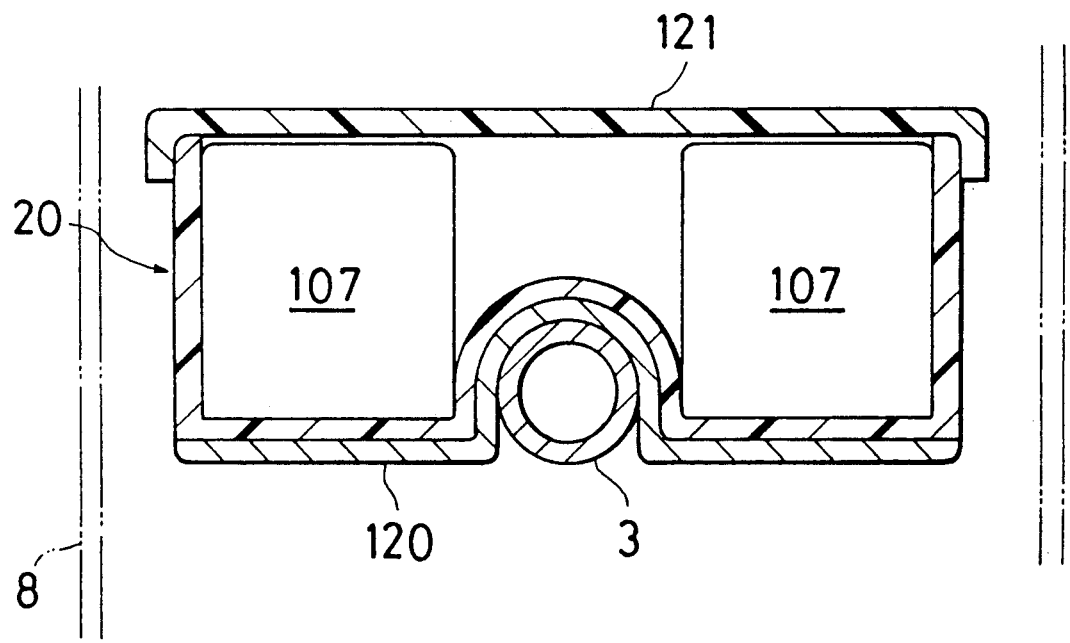

FIG. 13 shows a supporting structure of the battery box 20, wherein the battery box 20 is supported on the supporting plate 120 fixed to the central frame 3 by protruding toward the right and left directions. The battery 107 is contained within its interior to the right and left by interposing the central frame 3. The battery 107 supplies electric power to the motor according to the control of the controller 21.

The operation of this embodiment will next be described in detail hereinafter.

This electric motor driven automatic bicycle is constructed in such a manner that the motor 30 is connected with the rear wheel 13 via the belt type stepless speed change transmission 31, a first centrifugal force clutch 78, a second centrifugal force clutch 85 and final reducing gear 32. The current of duty factor corresponding to the vehicle speed and the handling angle of the acceleration grip 100 is conducted, whereby running of the vehicle by the driving power of the motor 30 is realized.

That is, when the motor 30 is started by a start switch which is not shown, the rotary shaft 50 is rotated. In the time when the acceleration grip 100 is positioned at the idling position and the rotational speed of the motor 30 is small, first and second centrifugal force clutches 78, 85 are in a state of cut off, and the driving power of the motor 30 is not transmitted to the rear wheel 13 and the belt type stepless speed change transmission 31 is in an idle running state. Therefore, the current and torque of the motor are not raised over the requirement, and large current and high torque produced originally at the time of starting and in a low rotational range, as well as the load under the state of low efficiency, can be avoided. When the acceleration grip 100 is rotated from this state whereby the rotational speed of the motor 30 is increased, the centrifugal weight 73 is moved axially outwardly along the ramp plate 72 fixed to the rotary shaft 50, and thereby the movable face 71 of the driving pulley 66 is moved in the direction approaching the fixed face 70.

Accordingly, the effective radius of the driving pulley 66 is increased and at the same time, the movable face 77 of the driven pulley 68 is driven in a direction away from the fixed face 76 through the endless belt 69, whereby the effective radius is decreased. As a result, the reduction ratio of the belt type stepless speed change transmission 31 is decreased whereby the rotational speed of the sleeve 75 for rotating together with the driven pulley 68 is increased. Consequently, when the rotational speed of the driven pulley 68 reaches the established rotational speed in the vicinity of the maximum efficiency producing rotational speed No of the motor, the first centrifugal force clutch 78 is connected whereby the driving power of the motor 30 is transmitted to the input shaft 67 of the reducing gear. The rear wheel 13 is thereby driven through the final reducing gear 32. Thereafter, the motor is speed-changed in response to the speed change curve shown in FIG. 11 and at this moment, the efficiency of the motor 30 is maintained at the vicinity of maximum efficiency $n_{max}$. Particularly, in the usual speed change range, it is maintained at approximately maximum efficiency $n_{max}$ at 100% of the duty factor.

The above is a desirable establishment considering the current custom, wherein the conventional small type scooter is apt to be used in a state that the throttle is substantially fully opened.

Figure 14A:
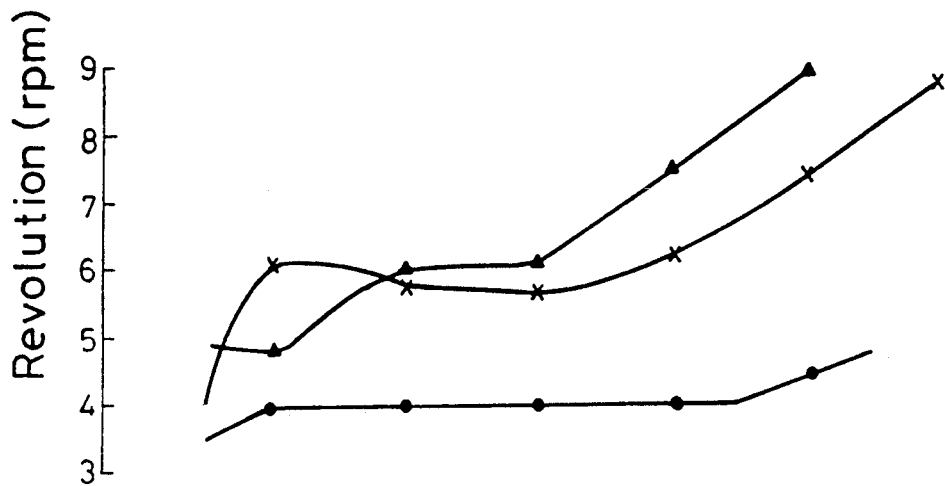
Figure 14B:
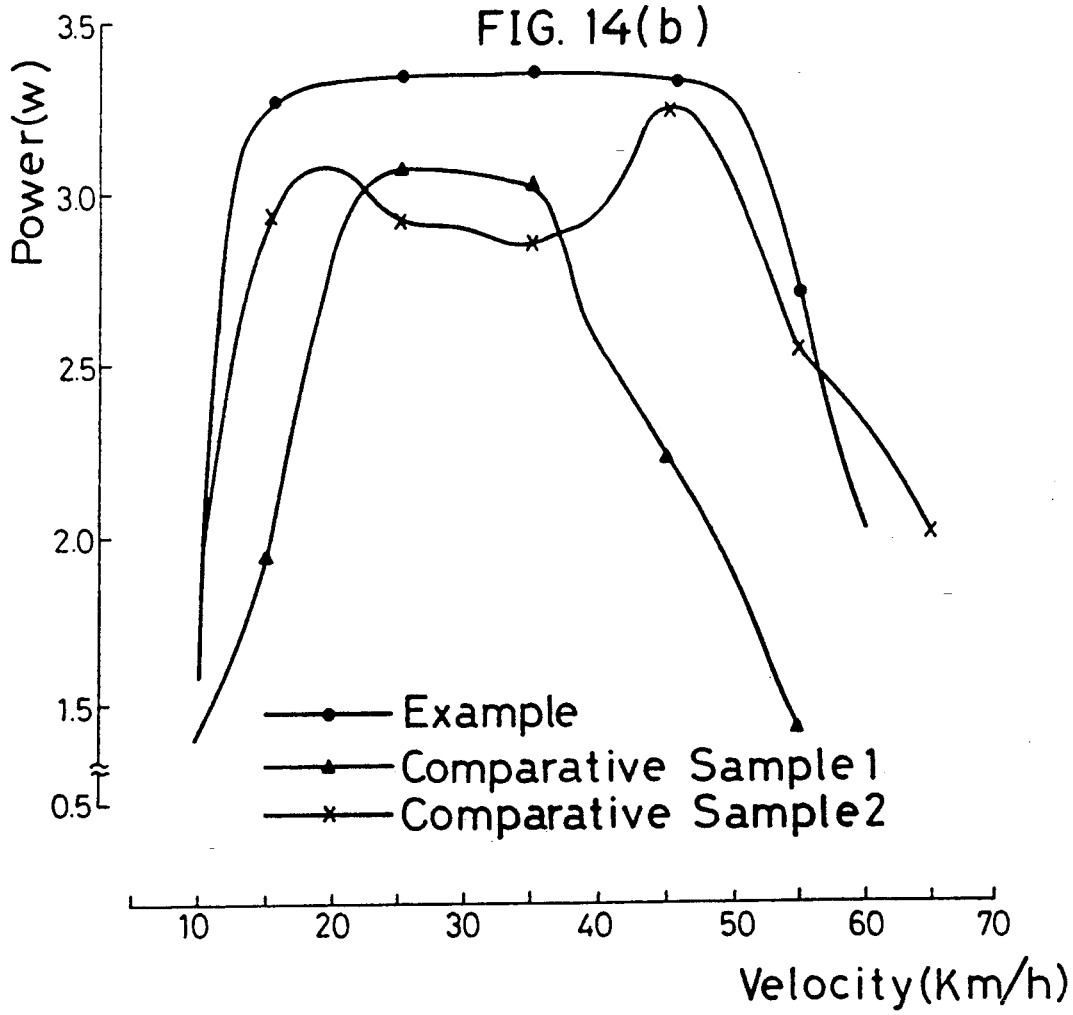

FIGS. 14(a) and 14(b) are graphs showing the running capacity wherein the vehicle speed is shown as the abscissa, and the rear wheel output and the rotational speed of the motor or engine is shown as ordinates. The capacities of comparative examples 1 and 2 are noted in combination. As will be apparent from this graph, the article of this embodiment, in the case of comparing with the comparative examples 1 and 2, is obtained with lower rotation and higher output. Therefore, the torque and current required to rotate the motor 30 becomes relatively lower while the duty factor of the motor 30 becomes relatively less, and thereby, the consumed quantity of electric power and the quantity of generated heat are suppressed. Since the discharging efficiency of the battery is increased and is therefore made to have a long life, the motor can be operated with a correspondingly small current and with resultant low heat generation quantity, and can therefore be made to be of light weight and miniaturized. Further, in the usual range, the rotational speed of the motor and the rear wheel output can be maintained within an extremely wide range and substantially constant, without the appearance of a mountain or valley as in the comparative example. Therefore, a broad flat torque characteristic can be realized, and thereby smooth running can be obtained.

When the duty factor in the usual range is set, for example, to 60%, excessive output against the running resistance can also be ensured. That is, as the running resistance curve is written in combination in the diagram FIG. 11(b) in the interval between a point P2 to a point P3, required torque is raised as much as α. Wherein, when each of the vehicle speed and the driving shaft torque of points P2 and P3 are set to V2, T2, and V3, T3, respectively, within the interior of the belt type stepless speed change transmission, it happens that the driving shaft torque at the point P2 is decreased as much as V2/V3 times. Therefore, in order to increase the driving torque and vehicle speed in a direction from the point P2 toward the point P3, the torque increase of as much as $$T = T3 - T2 = \alpha + (V3/V2) T2$$

is required.

Figure 12:
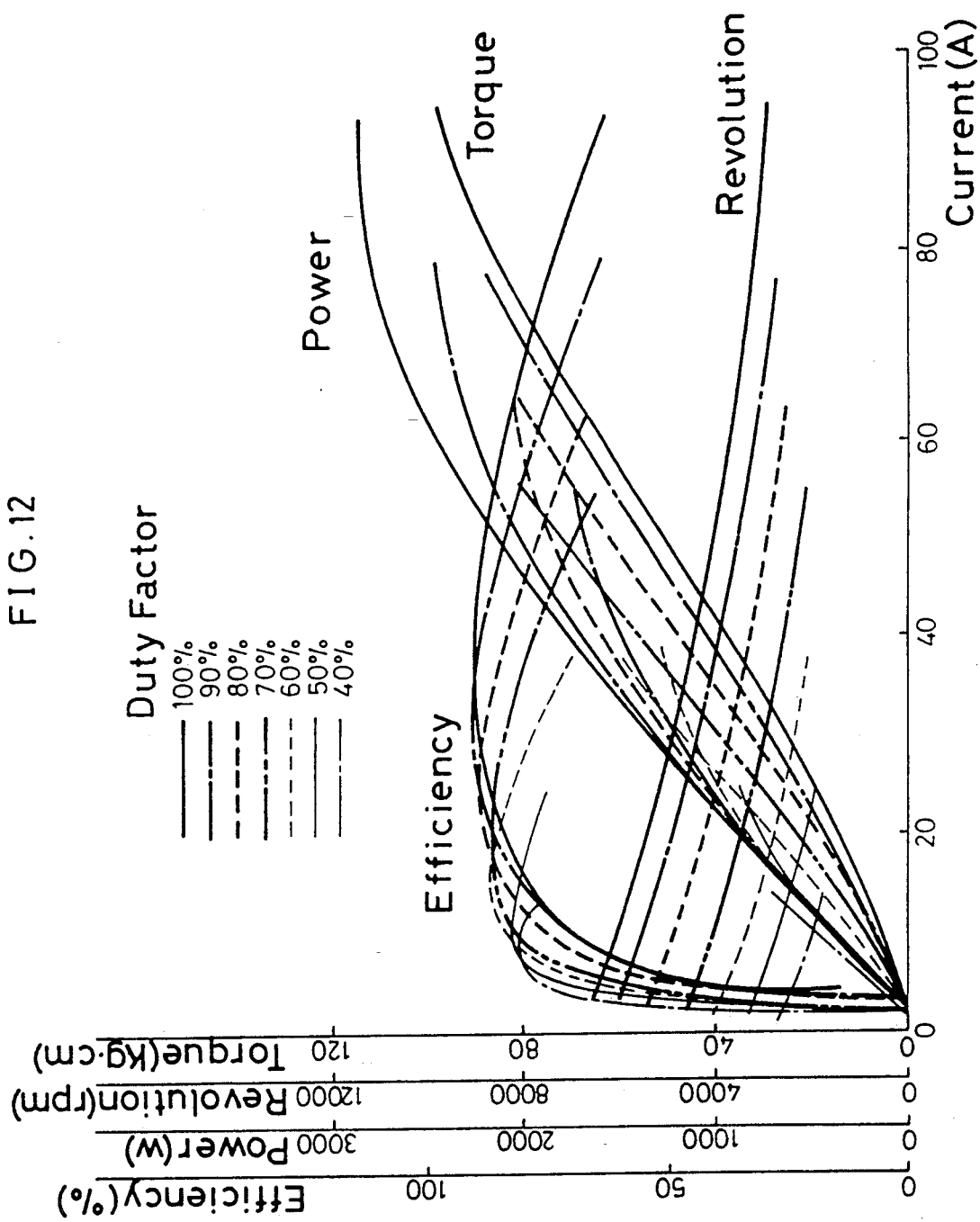

However, since the motor characteristic of duty factor corresponding to the diagram in FIG. 14(a) becomes as shown in FIG. 12 when the duty factor of the motor in the usual range is previously set to, for example, 60%, by increasing the duty factor so as to tie up in turn each peak or the efficiency curve by duty factor from the point P3, the output increase directed toward the point P4 is ensured, and it is possible to overcome the increase of the running resistance. That is, the setting of the usual range of the duty factor in the case of 60% enables to ensure 40% as the duty factor of excessive amount against the running resistance, and therefore smoother and more powerful running becomes possible.

Further, the second centrifugal force clutch 85 is connected when the rotational speed of the input shaft 67 of the reducing gear reaches over the established rotational speed less than the established rotational speed of the first centrifugal force clutch 78 at a state that power is transmitted from the rear wheel 13 to the belt type stepless speed change transmission.

Accordingly, during the time of speed reducing or braking, the second centrifugal force clutch 85 is connected whereby the torque produced at the rear wheel 13 is transmitted to the motor 30, therefore, the motor 30 can be used as a load. Further, the established rotational number of the second centrifugal force clutch 85 is less than the established rotational number of the first centrifugal force clutch 78, and since the second centrifugal force clutch 85 maintains the connected condition even after the first centrifugal force clutch 73 is unengaged in the time of speed reducing, speed reducing can be smoothly executed whereby a good running feeling can be obtained. Particularly, in this embodiment, since electric braking is carried out by the motor 30 even in the time of braking, a better braking characteristic can be obtained.

The cooling system within the power unit 1 will next be described in detail hereinafter. When the rotary shaft portion cooling fan 53 provided as cooperating with the rotary shaft 50 is rotated upon driving of the motor 30, relatively clean air within the container 19 is further cleaned by passage thereof through the filter 48 provided at the joint 45, and is introduced into the interior of the cover 42 through the duct 44. This cooling air passes through the midst of the cooling fins 40 of the driver 39 contained within the air introducing chamber 43 whereby cooling of the driver 39 which assumes a high temperature by the heat generation of the driver and the like. The air that has cooled the driver 39 cools the rotor position sensor 65, and then the air flowing from the vent 37 of the stator housing 33 into its interior cools the stator coil 61 of the heat-generated motor 30 whereby deterioration of capacity according to the heat generation of the motor 30 can be prevented. Thereafter, the air flowing from the vent 49 formed in the partitioning wall 48 into the interior of the transmission case 28 cools the belt type stepless speed change transmission 31 as well as the pulley portion cooling fan 74, and is discharged from the discharge outlet 55 to the exterior.

Thus, when the rotary shaft portion cooling fan 53 is positioned near the middle of the motor 30 to the belt type stepless speed change transmission 31 to thereby be implemented in common, the cooling mechanism can be simplified. Since this cooling air can cool the driver 39, it is not necessary to provide an exclusive cooling mechanism which is therefore advantageous. Further, since the rotor position, sensor 65 which should be kept dust free is provided on the upstream side of cooling air adhering of dust can be effectively prevented. In this case, since the filter 48 is provided, the air becomes even cleaner. In addition, since the inlet of the duct 44 is opened to the space of the interior of vehicle body, clean air comprising less dust and moisture can be introduced. Further, according to this embodiment, although the duct 44 is connected to the interior of the container 19, this duct 44 can be connected in a suitable manner and place to the frame pipe.

Similarly, since the motor 30 is located upstream of the cooling air, the motor 30 can avoid the heating effect from the belt type stepless speed change transmission 31 side. At the same time, when the first cooling fan 53 is made coaxially with the rotary shaft 50, the power unit 1 can be made to be of small size and light weight. Since the discharge outlet 55 is provided at the rear end portion of the transmission case 28, the entire transmission mechanism can be cooled.

Furthermore, this embodiment includes many advantages other than the above description. Firstly, since the motor housing 27 and the transmission case 28 are made integrally, the number of parts can be decreased and at the same time, since the stress can be dispersed to both sides, strength is increased. Also, heat dispersion improves whereby the cooling efficiency of the side of the motor housing 27 is increased.

Moreover, since the stator 62 of the motor 30 can be assembled into the interior of the motor housing by insertion from into the opening portion, work is easy, and particularly, according to this embodiment, since it is previously fixed to the motor housing 33 and is inserted from the opening portion of the motor housing 27, assembling ease is improved.

Next, since the rotary shaft 50 of the motor serves concurrently as the input shaft of the belt type stepless speed change transmission 31, an axial directional dimension of the power unit can be reduced. Further, since the electric power supply wire cord 47 for connecting with the motor 30 and the driver 39 is pierced through the interior of the duct 44, mud and moisture and the like splashed onto the duct can be made so as not to directly disturb the electric power supply cord 47 even without using other particular members. Further, when the power supply cord 47 is previously passed through the side of the cover 42, the cover 42 can be fixed at the wired state, whereby assembling efficiency is increased. In this case, it is not necessarily required to pass the cord through the cover 42 or its similar functional parts. Since the electric power supply cord 47 is directly drawn out of the motor housing 27 of the opposite side of the belt type stepless speed change transmission to the exterior, it can be passed to such a place that does not interfere with the belt type stepless speed change transmission 31.

Hereinafter, another embodiment according to the present invention will be described in detail. With respect to parts common with the previous embodiment, the same reference symbols or numerals are used, and only different elements will be described in order to avoid further explanation. With respect to the other parts, important matter designated with reference symbols and shown in the drawings will be considered, and explanation of other elements will be deleted except in a particularly necessary case (hereinafter same).

Figure 15:
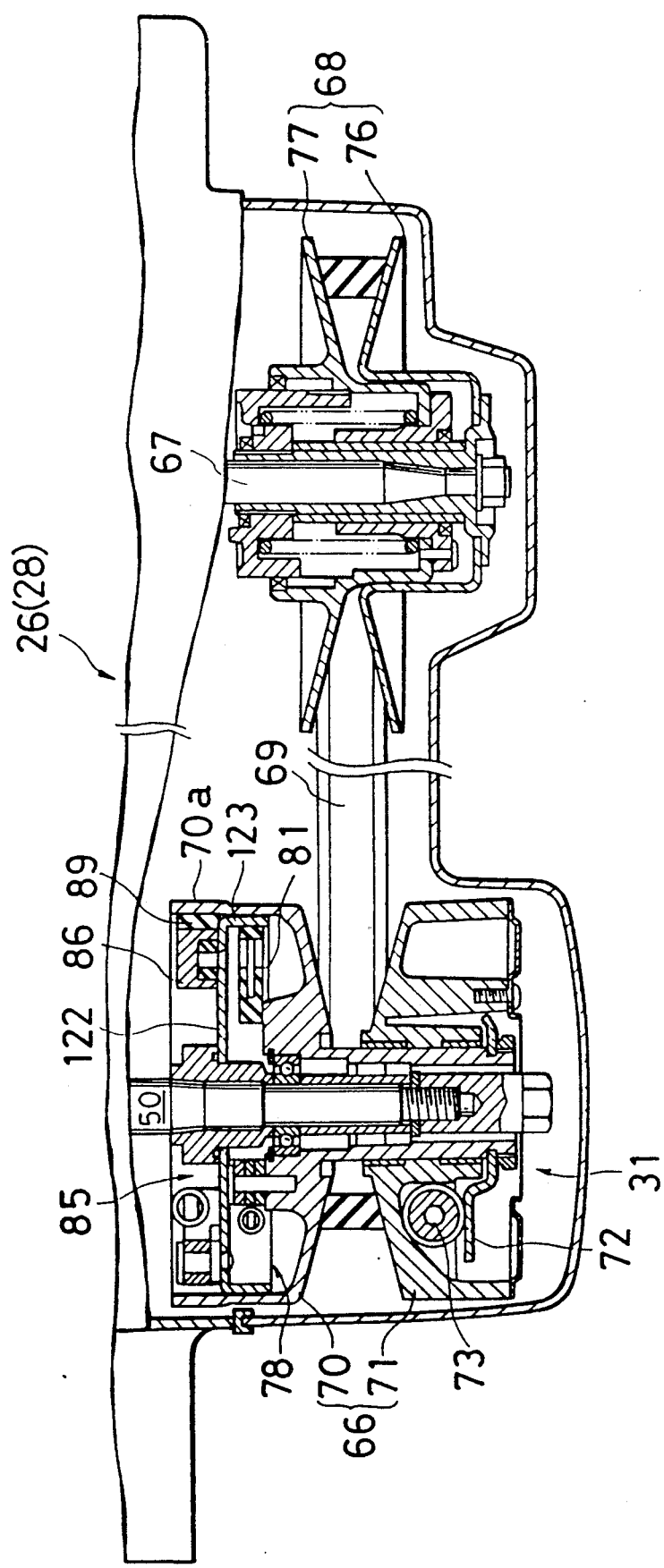

FIG. 15 is a second embodiment of the first centrifugal force clutch 78 and the second centrifugal force clutch 85 provided on the side of the driving pulley 66, and only the parts corresponding to the belt type stepless speed change transmission 31 of FIG. 2 are shown. In this embodiment, both clutches are contained about the rear surface of the fixed face 70 of the driving pulley 66. That is, the first centrifugal force clutch 78 utilizes the fixed face 70 as a clutch outer, and the arm 81 fixed to the base portion side of the fixed face 70 is made to be able to slide with the internal surface of the external circumferential flange 123 of the clutch inner 122 fixed to the rotary shaft 50. On the other hand, the second centrifugal force clutch 85 utilizes the internal peripheral wall 70a of the fixed face 70 wherein a pad 89 of the bent arm 86 is fixed to the clutch inner 122 extended in parallel with the rotary shaft 50 of the motor as a clutch outer and thereby it is made slidable to this. When it is made as such, the driving pulley 66 can be effectively utilized allowing a reduction of the number of parts and a compact construction.

Figure 19:
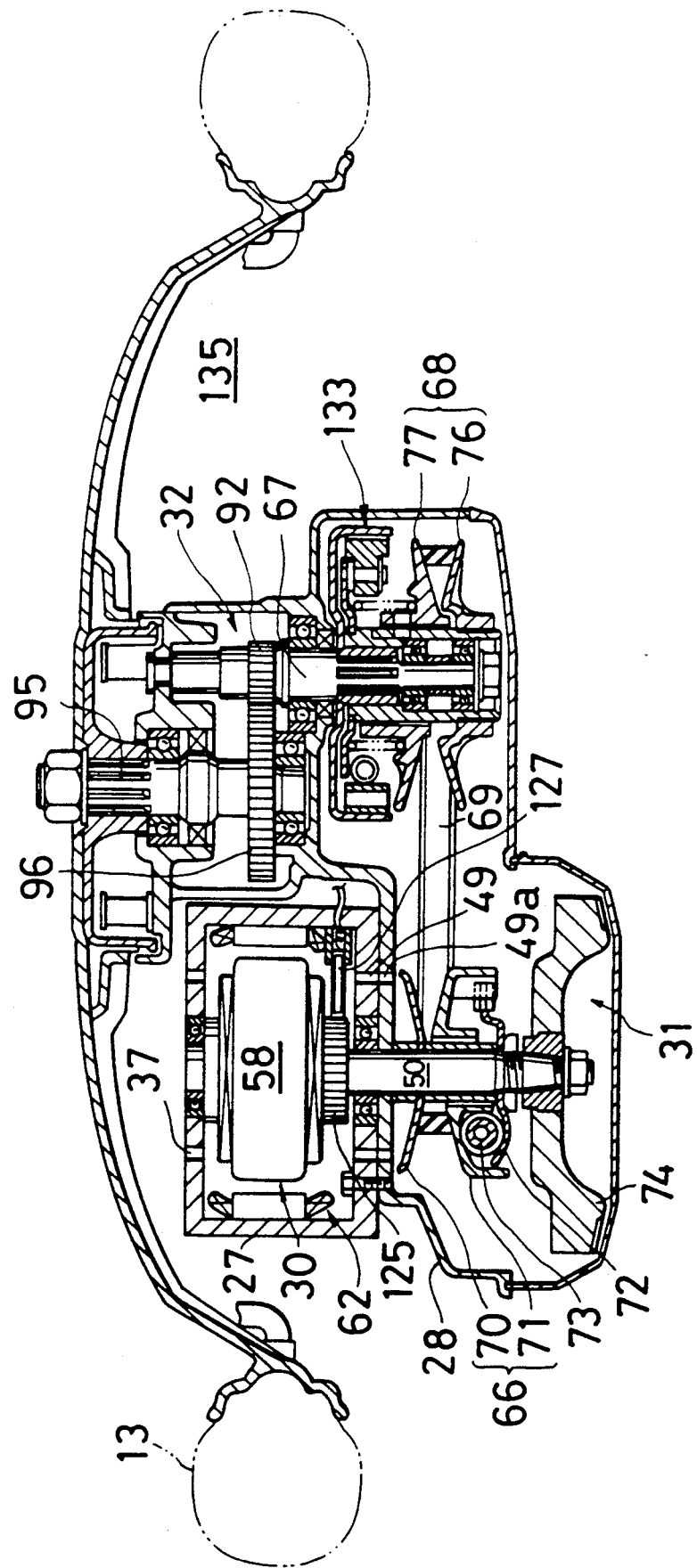

Further, both of these clutches can be provided to the movable face 71 side of the driving pulley 66, and also can be provided to the movable face 77 of the driven pulley 68 (refer to FIG. 19).

Figure 16:
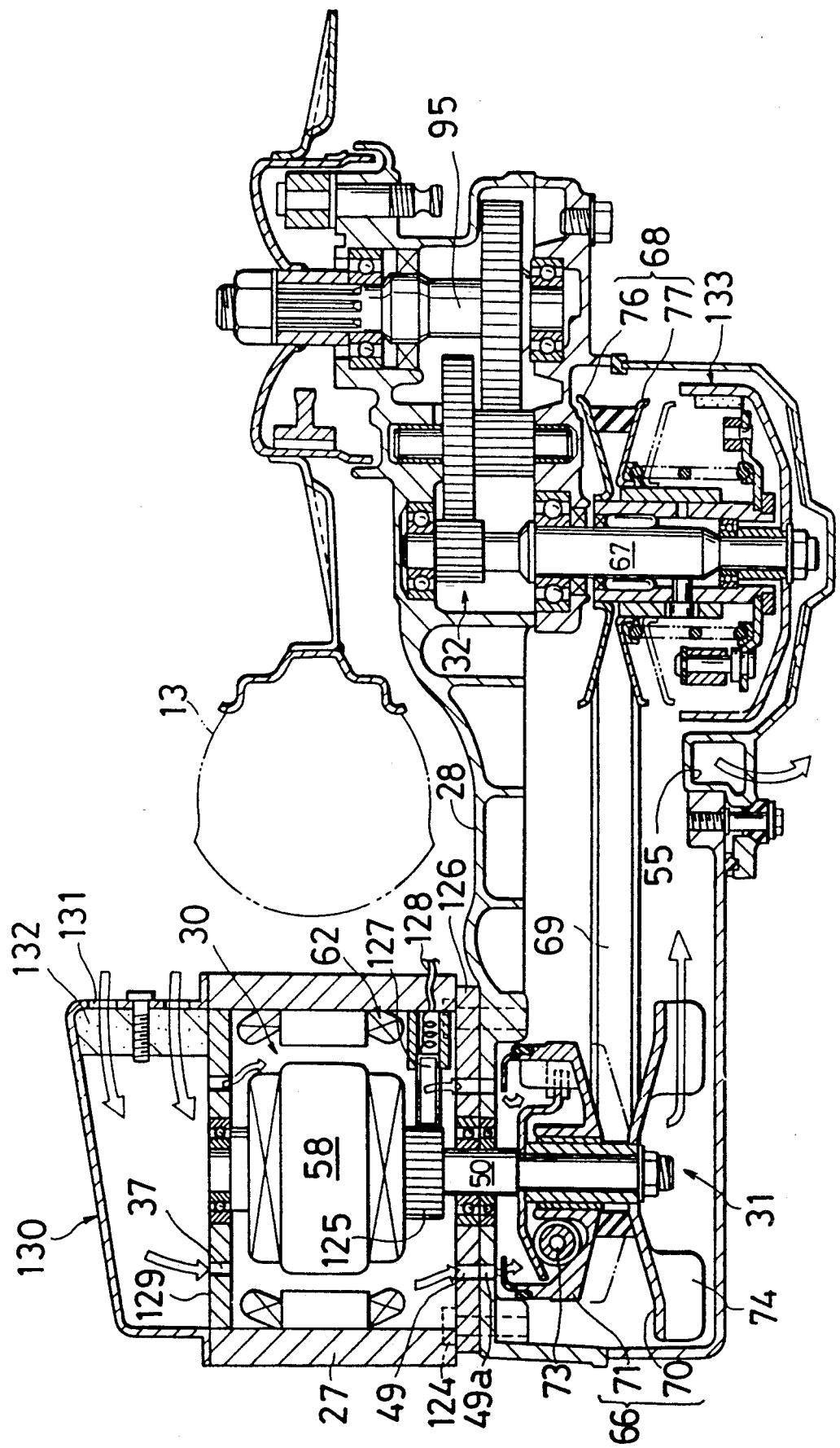
FIG. 16 is a fragmentary diagram corresponding to FIG. 2 according to a third embodiment.
Figure 17:
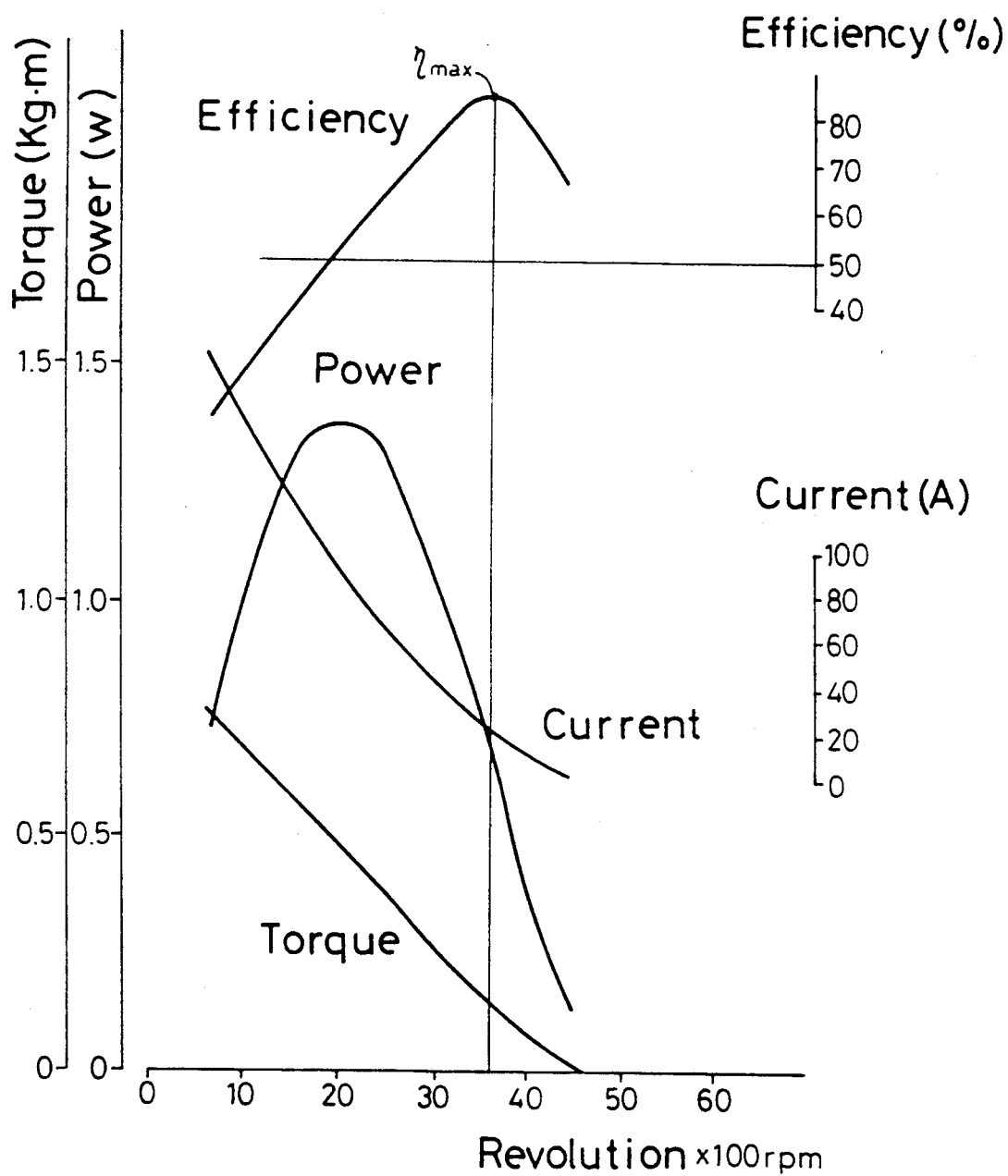
FIG. 17 is a graph for a motor characteristic thereof.

FIGS. 16 and 17 show a third embodiment utilizing a brush type motor.

As shown in FIG. 16, the motor housing 27 is separately constructed from transmission case 28, and is fixed by bolt 124. The stator 62 of the motor 30 is fixed to the internal surface of the motor housing 27, and the commutator 125 is contacted with the brush 127 provided on the side portion of the motor housing 27 at between the rotor 58 and the wall 126 connected to the transmission case 28 of the motor housing 27. Electric power supply cord 128 of the brush 127 is extended to the exterior of the transmission case 28 by piercing through the wall portion of the motor housing 27.

A vent 37 is provided within the cover 129 for covering the right side opening portion of the motor housing 27, and an air cleaner 130 is provided to its right side. A suction inlet 131 for communicating the outside air is formed within the wall surface of the air cleaner 130, and filter element 131 is contained along the inside of this portion. The interior of the air cleaner 130 is communicated with the interior of the motor housing 27 through the vent 37. Another vent 49 is also provided within the wall 126, and another vent 49a is formed within the side of the transmission case 28 superposing with the wall 126.

A transmission mechanism according to this application and an automatic centrifugal force clutch 133, are provided in cooperation with the driven pulley 68 side of the belt type stepless speed change transmission 31 connected with the rotary shaft 50 of the motor 30.

According to this embodiment, forced cooling for the parts of the motor 30 and the belt type stepless speed change transmission 31 of the transmission case 28 is simultaneously carried out by the single pulley portion cooling fan 74. Other parts are generally the same with respect to the first embodiment.

FIG. 17 shows a motor characteristic of this embodiment, the rotational speed of the motor is taken as the abscissa, and efficiency, output, current and torque are taken as ordinates. In this embodiment, since maximum efficiency $n_{max}$ is obtained in the case when the rotational speed of the motor is about 3700 rpm and efficiency is sufficiently increased as it is approximately over 50% at 2000-4500 rpm, the efficiency corresponding to this rotational speed is in the vicinity of maximum efficiency according to this embodiment. Particularly, according to this embodiment, since the duct portion for cooling air can be made short and the brush 127 is located at an opposite side of the air cleaner 130 by interposing the motor 30, negative effects on the brush 127 caused from dust and moisture sucked in together with air can be decreased. Furthermore, since the electric power supply cord 128 is drawn out of a side portion of the motor housing 27 to the exterior thereof, even though it is made as such, the elements do not interfere with the belt type stepless speed change transmission.

FIGS. 18 to 22 illustrate a fourth embodiment.

Figure 18:
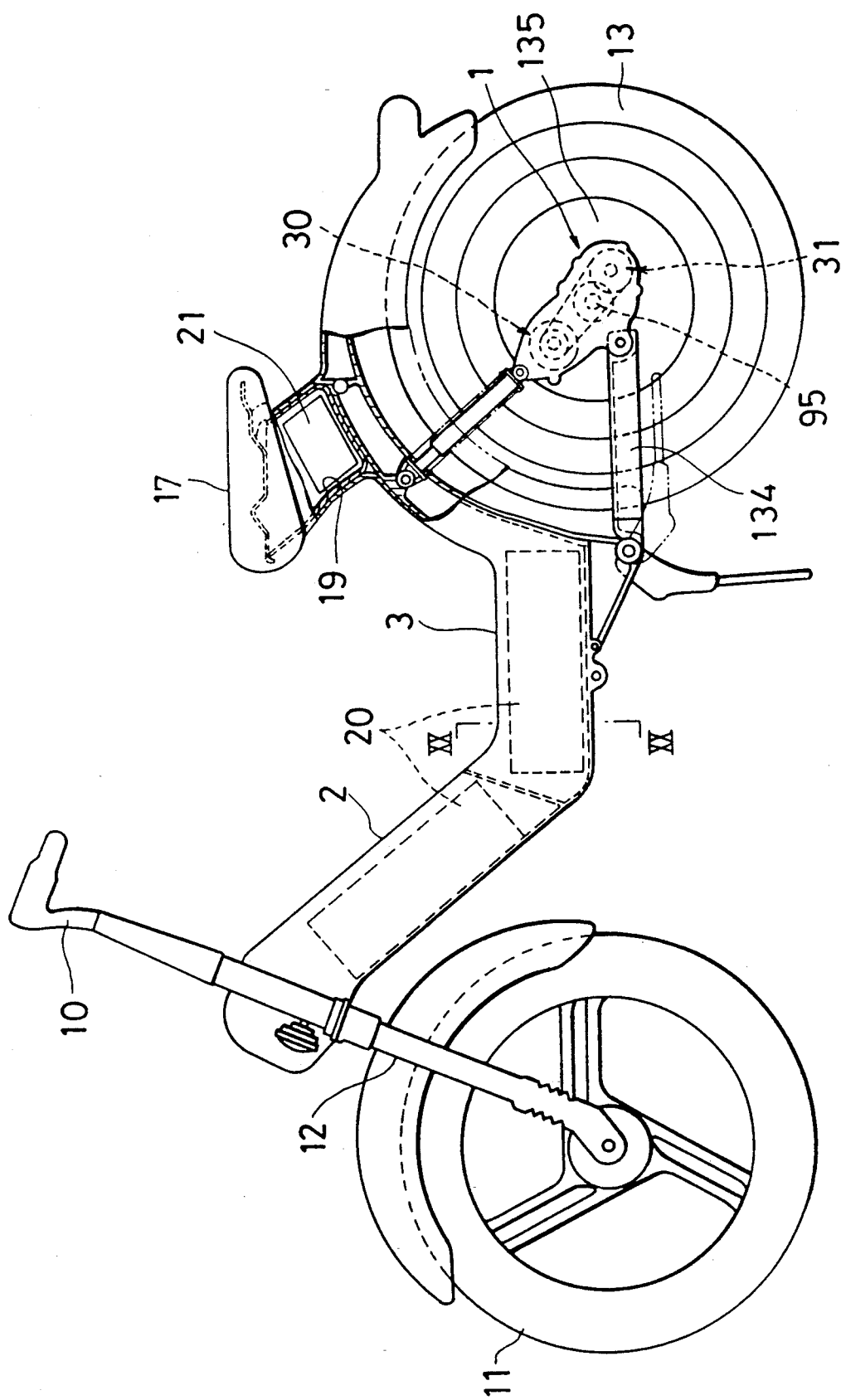

FIG. 18 illustrates a side view of the electric motor driven automatic bicycle according to this embodiment, and FIG. 19 shows a cross-sectional view of said power unit. The front frame 2 and central frame 3 are channel shaped. The power unit 1 is pivotally fixed to a plate-shaped connecting member 134 extended along to the rearward portion from the central frame 3, and is contained within recess 135 of the convex to vehicle center side formed to the side of rear wheel 13. The motor 30 is arranged so as to be upward of the wheel shaft 95. A controller 21 is contained within a small container 19 formed downward of seat 17.

The interior structure of the power unit 1 has a similar basic structure as the previous embodiment, as shown in FIG. 19, but it is constituted in such a manner that the air cleaner is deleted. The final reducing gear 32 is simplified and input gear 92 formed in cooperation with the input shaft 67 of the reducing gear and the output gear 96 on the wheel shaft 95 are directly meshed to each other. Automatic centrifugal force clutch 133 is arranged near the vehicle body center side to the rear surface of movable face 77 forming the driven pulley 68. Pulley portion cooling fan 74 is arranged coaxially with the rotary shaft 50 separately to the driving pulley 66.

According to this embodiment, since the power unit 1 assembled with the motor 30 is miniaturized to be contained within the recess of the side surface of the rear wheel 13, the entire unit is made lighter and slimmer and at the same time, external appearance becomes neat and smart. Further, since the motor 30 is disposed upward the wheel shaft 95, it becomes difficult for mud and water to enter the motor 30.

Figure 20:
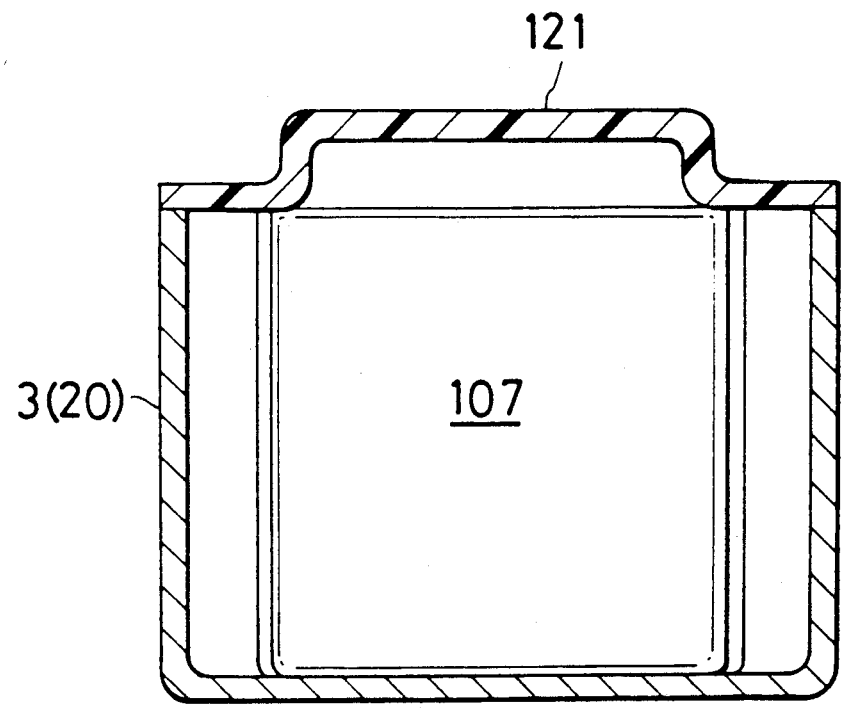

As shown in FIGS. 18 and 20, battery 107 is contained within the central frame 3. According to this, assembling and disassembling of the battery 107 is easy. Further, the battery 107 is effectively protected by the central frame 3. The battery 107 can be implemented in a similar manner in the front frame 2 side.

Figure 21:
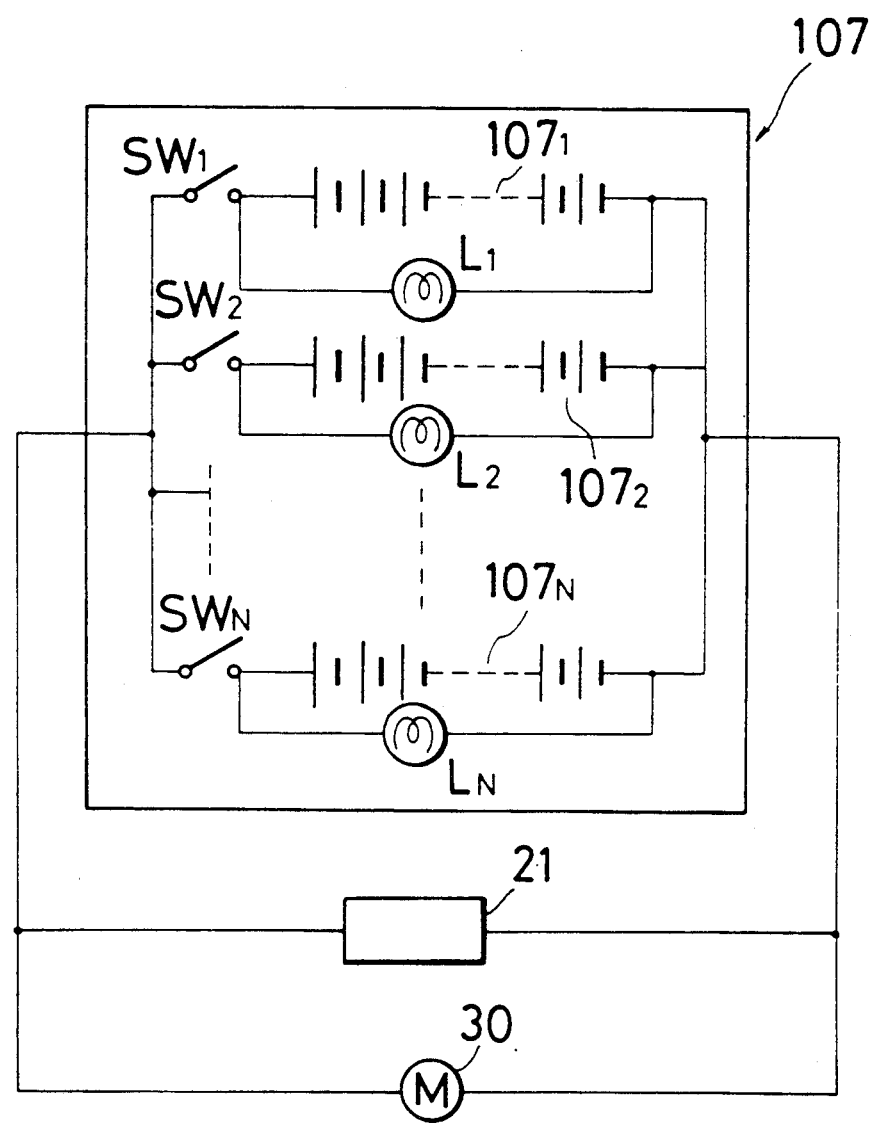

Furthermore, the battery 107, according to this embodiment, as shown in FIG. 21, is connected in parallel with the controller 21 and the motor 30. The battery 107 itself is structured to utilize a plurality of individual batteries $107_1$ - - - $107_N$ connected in parallel and the remaining capacity indicator of the battery is implemented by the shifting of switches $SW_1$ - - - $SW_N$, and lamps $L_1$ - - - $L_N$.

That is, since constant voltage is maintained when sufficient discharge capacity is present respectively in each of the individual batteries $107_1$ - - - $107_N$, each lamp $L_1$ - - - $L_N$ will be lighted brightly. Wherein, when, for example, the switch $SW_1$ is firstly turned ON and the motor 30 is driven, the lamp $L_1$ is brightly lit in the beginning, but soon the discharge capacity of the individual battery $107_1$ is dropped down by the load of motor 30 whereby the voltage is dropped down.

At this moment, since the internal resistance of the motor 30 is less than the lamp $L_1$, the lamp current is gradually decreased, and the lamp $L_1$ becomes dark. Since this lamp $L_1$ condition indicates reduction in the remaining discharge capacity of the battery $107_1$, a rider may turn ON, for example, the switch $SW_2$ for switching to the battery $107_2$. Thus, in accordance with the indication based on the lighting condition of a lamp, the batteries can be used by switching to one that has a discharge capacity in turn, one by one, to a next new one.

Figure 22:
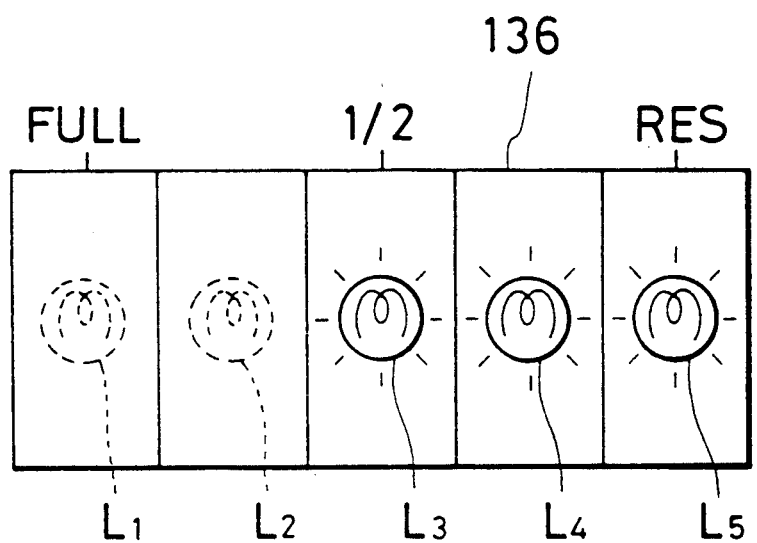

FIG. 22 is a specific example of a remaining capacity indicator, which shows a remaining capacity indicator 136 constituted in such a manner that the interior of one frame member is partitioned into five sections aligned linearly, and five lamps $L_1$ - - - $L_5$ (that is, N=5) are respectively contained within a section. The number of indicating lamps is voluntarily selected.

Thus, when respective lamps $L_1$ - - - $L_5$ are aligned linearly, the number of batteries remaining with discharge capacity can be easily accounted for according to the number of lamps brightly lit. For example, when all are lit brightly, all of individual batteries $107_1$ - - - $107_5$ have sufficient discharge capacity.

In the case when the discharge capacity is ½, about half of the indicator lamps (in this embodiment, $L_3$-$L_5$ among the five) are brightly lit. The indicator lamps corresponding to the individual batteries having no discharge capacity ($L_1$ and $L_2$) are dimly lit. When all are blacked out (or dimly lit), it can be instantly recognized that all the batteries have no remaining discharge capacity.

Although the usual remaining capacity indication of the battery conventionally used is indicated by the voltage drop of the battery, since the voltage varies by temperature, there is a case of using a temperature compensation circuit and the like so as to obtain a correct indication. In the case of an alkali battery (Ni - Cd, Ni - Zn) and the like, since the quantity of voltage drop is small and since such a battery has a characteristic that the voltage does not greatly drop until the discharge capacity becomes over 90%, there may be a difficulty in confirming the remaining capacity. In regard to this point, according to this embodiment, since the remaining capacity corresponds to the number of batteries in use which can easily be recognized, the system is simple in structure and correct remaining capacity indication can be expected.

Figure 23:
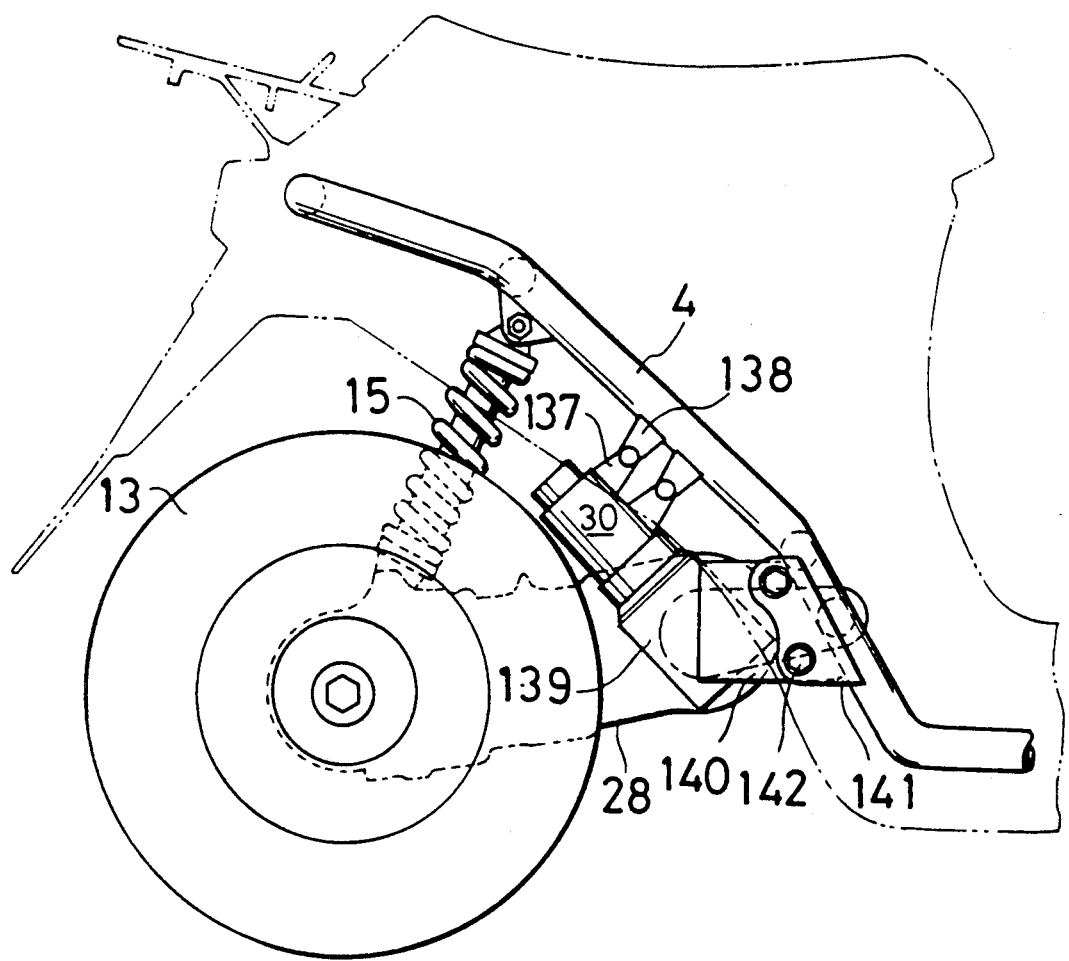
FIG. 23 is a fragmentary side view of a rear part of the vehicle body according to the fifth embodiment.
Figure 24:
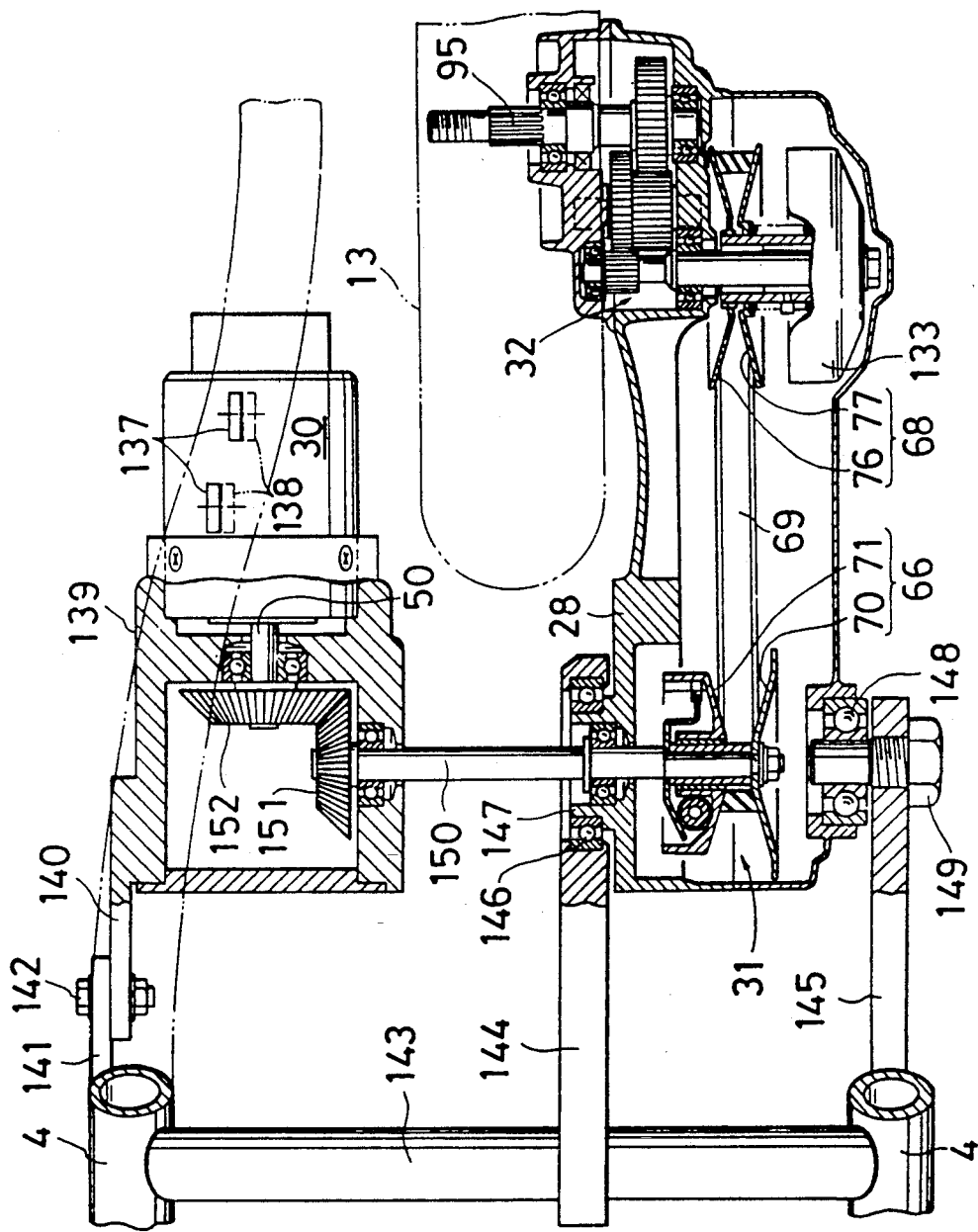
FIG. 24 is a fragmentary cross-sectional view of an essential part of FIG. 23.

FIGS. 23 and 24 illustrate a fifth embodiment wherein the motor and the transmission mechanism are separately constructed. FIG. 23 shows a side view of the right side of the rear portion of the vehicle body, wherein the motor 30 is connected to the bracket 138 provided by protruding rearwardly the side portion bracket 137 to the rear frame 4. A supporting plate 140 extending frontward of box 139 meshed with one end of the motor 30 is connected to a bracket 141 extending from the rear frame 4 rearward by bolt 142 to thereby be fixed to the rear frame 4 side.

FIG. 24 is a diagram illustrating a transmission mechanism portion by sectional view, wherein rear frame 4 is provided with a pair of members on the right and left, and both sides of the front end portion of the transmission case 28 are rotatably supported to each of the rear end portions of supporting arms 144, 145 extended rearward respectively from the middle portion of cross pipe 143 connected between said both parties and the rear frame 4 of the left side. A belt type stepless speed change transmission 31 similar to the third embodiment, final reducing gear 32 and automatic centrifugal force clutch 133 are provided within the transmission case 28.

Connection of the transmission case 26 and the supporting arm 144 is made by engaging a boss portion 147 formed to the right side of the transmission case 28 to a bearing 146 provided cooperating with the rear end portion of supporting arm 144.

Input shaft 150 of the belt type stepless speed change transmission 31 is arranged in parallel with cross pipe 143 on a same axis of pivot bolt 149. The driving pulley 66 is supported along a first end of the input shaft 150, and the other end is engaged within the interior of gear box 139, to thereby be connected with bevel gear 151. At the same time, the input shaft 150 is rotatably supported by a ball bearing provided at the wall of the gear box 139 and a boss portion 147 of transmission case 28. Bevel gear 151 is meshed with bevel gear 152 mounted to an end of rotary shaft 50 of the motor 30.

When the motor is made as such, since the motor side is made to be stationary, and only the side of the transmission case 28 oscillates around the input shaft 150 of transmission and pivot bolt 149. Spring load quantity is thereby decreased and the oscillating portion can be made to a required minimum limitation to thereby advantageously improve vehicle lay out. Further, each supporting method with respect to the motor 30 and the rear frame 4 of the transmission case 28 is not limited to this embodiment but various methods are possible.

Thus, although the embodiments of the present invention are described in detail, the present invention is not limited by the aforementioned respective embodiments. Without departing from this invention as described in the claims, various changes can be carried out. For example, the power unit 1 is not limited to an automatic bicycle but can be utilized with other vehicles such as an automatic tricycle.

Although the present invention has been described in its preferred form, it should be understood that the preferred embodiments of the present invention are not limiting. The scope of the present invention, instead, should be defined solely by the appended claims. Accordingly, changes and modifications in the construction, combination and arrangement of parts of the preferred embodiments may be contemplated without departing from the spirit and scope of the invention defined solely by the appended claims.

We claim:

1. A drive system for an electric motor driven vehicle comprising:
   an electric motor;
   a driving wheel; and
   a belt type stepless speed change transmission for transmitting the rotation of said electric motor to said driving wheel to run the vehicle;
   said belt type stepless speed change transmission functions as torque reducing means for maintaining motor speed within a range preselected to be within a desired percentage of maximum motor efficiency.

2. The drive system of claim 1, further comprising an automatic centrifugal clutch functioning as a starting clutch disposed between said electric motor and driving wheel.

3. The drive system of claim 2, wherein said belt type stepless speed change transmission varies between two ratios, a maximum ratio and a minimum ratio, which maintains a proper rotational speed of said electric motor such that said electric motor operates a substantially maximum efficiency of a 100% duty factor between said two ratios.

4. The drive system of claim 2, wherein said belt type stepless speed change transmission varies between two ratios, a maximum ratio and a minimum ratio, and a duty factor during normal transmission is established at a predetermined value less than 100% so as to be obtained with an excessive output corresponding to at least an incremental amount of running resistance at said maximum ratio.

5. The drive system of claim 1, wherein the drive system is contained entirely in a unitary housing within a recess formed on an external side surface of said driving wheel.

6. The drive system of claim 1, wherein said desired percentage is 80% of operational maximum efficiency of said electric motor.

7. The drive system of claim 1 further comprising:
   a final reducing gear operatively coupled between said driving wheel of the electric motor driven vehicle and said belt type stepless speed change transmission for rotating said driving wheel;
   a starting clutch disposed between said driving wheel and said electric motor for enabling starting of said vehicle; and
   a single unitary housing containing said electric motor, said final reducing gear, and said belt type stepless speed change transmission.

8. The drive system of claim 7, a rotary shaft of said electric motor drives said belt type stepless speed change transmission, said torque reducing means of said belt type stepless speed change transmission including a driving pulley comprising:
   a first movable face slidably supported in an axial direction upon said rotary shaft;
   a first fixed face formed on an end of said rotary shaft away from said electric motor;
   a ramp plate fixed to said rotary shaft at a position between said electric motor and said first movable face; and
   a centrifugal force weight, in slidable contact directly between said first movable face and said ramp plate, movable in a radial direction towards and away from said rotary shaft to vary a distance said first movable face is supported along said rotary shaft from said first fixed face to respectively decrease and increase a torque of said electric motor.

9. The drive system of claim 8, said belt type stepless speed change transmission further comprising:
   an input shaft operatively coupled to and rotating said final reducing gear in response to rotation of said rotary shaft; and
   a driven pulley comprising
   a second fixed face rotatably supported to an end of said input shaft away from said final reducing gear, and
   a second movable face slidably supported in an axial direction upon said input shaft intermediate said electric motor and said second fixed face.

10. The drive system of claim 9, said belt type stepless speed change transmission further comprising:
    a first centrifugal force clutch, operating as an input shaft starting clutch, coupling a driving power of said rotary shaft to said driven pulley at a first established rotational speed; and
    a second centrifugal force clutch, operating as a braking clutch, operatively coupled to said input shaft and said driven pulley at a second established rotational speed less than said first established rotational speed,
    said first and second centrifugal force clutches operatively coupled to said second moveable face.

11. The drive system of claim 8, said belt type stepless speed change transmission further comprising:
    an input shaft, operatively coupled to and rotating said final reducing gear, in response to rotation of said rotary shaft;
    a driven pulley consisting of
    a second movable face slidably supported in an axial direction upon said input shaft, and
    a second fixed face rotatably supported to said input shaft intermediate said final reducing gear and said second movable face;
    a first centrifugal force clutch, operating as an input shaft starting clutch, coupling a driving power of said driving pulley to said input shaft at a first established rotational speed; and
    a second centrifugal force clutch, operating as a braking clutch, operatively connected to said input shaft at a second established rotational speed less than said first established rotational speed.

12. The drive system of claim 7, wherein the electric motor driven vehicle is an electric bicycle.

13. The drive system of claim 7, wherein said electric motor operates at 60% duty factor to ensure excessive output against running resistance.

14. A drive system for an electric motor driven vehicle comprising:
- an electric motor, coupled to an external control means and battery supply, for driving a rotary shaft;
- a final reducing gear, operatively coupled to a drive wheel of the electric motor driven vehicle, for rotating said drive wheel;
- a belt type stepless speed change transmission, operatively coupling said electric motor to said final reducing gear, for driving said final reducing gear in response to rotation of said rotary shaft;
- said electric motor, said final reducing gear and said belt type stepless speed change transmission housed within a single unitary housing;
- said battery supply comprising
  - a plurality of individual battery supplies, coupled together in parallel for supplying power to said electric motor, each comprising a battery coupled in series with a switch which couples a respective individual battery supply to said electric motor upon actuation, and
  - a plurality of lamps, each coupled in parallel across a respective one of said batteries of said individual battery supplies, for indicating discharge capacity and operational status of said individual battery supplies once said batteries are coupled to said electric motor upon actuation of said switches.

15. A power unit for an electric motor driving vehicle comprising:
- a driving wheel, rotatably supported to a transmission case and pivotally fixed to a vehicle body so as to be able to oscillate, for transporting the electric motor driving vehicle;
- an electric motor, housed within a motor housing mounted to a side portion of said transmission case, for rotatably driving said driving wheel;
- belt type stepless speed change transmission means, housed within said transmission case, for rotatably coupling said driving wheel to said electric motor; and
- port means, coupled between said transmission case and said motor housing, for transferring cooling air therebetween,
- said electric motor and said belt type stepless speed change transmission being cooled by common cooling fan which generates said cooling air.

16. The power unit of claim 15, wherein said common cooling fan is coupled to a driving pulley of said belt type stepless speed change transmission means.

17. The power unit of claim 15, wherein said common cooling fan is coupled adjoining said port means within said motor housing, and further mounted to a rotary shaft of said electric motor.

18. A power unit for an electric motor driving vehicle comprising:
- a driving wheel, rotatably supported to a transmission case and pivotally fixed to a vehicle body so as to be able to oscillate, for transporting the electric motor driving vehicle;
- an electric motor, housed within a motor housing mounted to a side portion of said transmission case, for rotatably driving said driving wheel;
- belt type stepless speed change transmission means, housed within said transmission case, for rotatably coupling said driving wheel to said electric motor; and
- duct means, a first end being coupled to an interior of said motor housing opposite that of said belt type stepless speed change transmission means and a second end being coupled to an interior space of the electric motor driving vehicle, for forcibly transferring cooling air from said interior space of the electric motor driving vehicle to said interior of said motor housing,
- an electric power supply cord of said electric motor being arranged with said duct means.

19. A drive system for an electric motor driven vehicle comprising:
- an electric motor, coupled to an external control means and battery supply, for driving a rotary shaft;
- a final reducing gear, operatively coupled to a drive wheel of the electric motor driven vehicle, for rotating said drive wheel;
- a belt type stepless speed change transmission, operatively coupling said electric motor to said final reducing gear, for driving said final reducing gear in response to rotation of said rotary shaft,
- said electric motor, said final reducing gear and said belt type stepless speed change transmission housed within a single unitary housing; and
- cooling means, for cooling said electric motor and said belt type stepless speed change transmission, comprising
- motor housing, mounted on a first end of said electric motor away from said rotary shaft, for covering said electric motor, said motor housing including a duct vent receiving cooling air,
- a first vent for directing said cooling air to said electric motor from said motor housing,
- a first fan, operatively coupled to and supported by said rotary shaft within said electric motor, for circulating said cooling air within said electric motor,
- a second vent for directing said cooling air to said belt type stepless speed change transmission from said electric motor, and
- a second fan, coupled to a first fixed face of a driving pulley formed on an end of said rotary shaft within said belt type stepless speed change transmission, for circulating said cooling air within said belt type stepless speed change transmission and out an exterior vent located away from said first fixed face.

20. The drive system of claim 19, further comprising:
- a flexible duct having first and second ends, coupled to said duct vent via said first end and a vehicle storage compartment via said second end, for directing said cooling air from said vehicle storage compartment to said motor housing.

21. The drive system of claim 20, further comprising:
- an electric power supply cord, coupled between said battery supply and said electric motor and fixed within said flexible duct for supplying power to said electronic motor.

22. The drive, system of claim 20, said vehicle storage compartment being magnetically shielded.

23. The drive system of claim 19, further comprising a heat sink disposed within said motor housing and fixed to said electric motor comprising: 'V-shaped cooling fins provided along internal surfaces of each lattice of said heat sink; and a plurality of field-effect transistors, fixed along external surfaces of said heat sink, conducting current for generating an alternating magnetic field in stator coils of said electric motor under direction of said control means.

24. The drive system of claim 23, wherein the electric motor driven vehicle is an electric bicycle including a drive circuit comprising:

an acceleration grip, operatively fixed to a steering mechanism of said electric bicycle, for designating a desired speed;

potentiometer means, operatively coupled to said acceleration grip and said control means, for supplying to said control means a signal indicative of said desired speed;

rotor position sensing means, coupled to said control means, for supplying a rotor position signal indicative of a position of a rotor of said electric motor in relation to said stator coils; and gate drive means, operatively coupled to said plurality of field-effect transistors and said control means, for supplying gate signals to direct said conducting of current, said control means controlling said gate drive means according to vehicle speed, as provided via vehicle speed sensing means, the position of said rotor, and said desired speed to direct said gate drive means.

25. The drive system of claim 23, wherein said heat sink is of hexagonal shape.

26. The drive system of claim 23, wherein said electric motor is an a.c. synchronous electric motor.

27. An electric motor driven bicycle comprising:

a vehicle body including front, central, and rear frame portions and a drive wheel, having a drive wheel axis, coupled to said rear frame portion; and a drive system contained in a single unitary housing, coupled to said central frame portion and said drive wheel, comprising an electric motor, coupled to an external control means and battery supply, for driving a rotary shaft, a final reducing gear, operatively coupled to said drive wheel, for rotatably driving said drive wheel, and a belt type stepless speed change transmission, operatively coupling said rotary shaft and said final reducing gear, for driving said final reducing gear, said battery supply, operatively coupled to said central frame portion substantially planar to a longitudinal axis of said central frame portion at a height substantially equal to said drive wheel axis, for supplying power to said electric motor, said battery supply comprising plural storage compartments for receiving plural batteries, said plural storage compartments straddling said central frame portion with said central frame portion intermediate therebetween so that said plural batteries are substantially planar to a lowest portion of said central frame portion.

28. The electric motor driven bicycle of claim 27, said plural batteries coupled in parallel, said battery supply further comprising:

a plurality of lamps respectively coupled in parallel with respective ones of said plural batteries; and a plurality of switches respectively coupled in series with respective ones of said plural batteries, said plurality of switches respectively coupling said plural batteries into operation so that respective ones of said plurality of lamps indicate discharge capacity and operational status of said plural batteries.

* * * * *